(12) United States Patent
Taguchi et al.

(10) Patent No.: US 7,303,272 B2
(45) Date of Patent: *Dec. 4, 2007

(54) BLACK INK FOR INKJET RECORDING AND INKJET RECORDING METHOD

(75) Inventors: Toshiki Taguchi, Fujinomiya (JP); Takashi Ozawa, Fujinomiya (JP); Toshiaki Aono, Fujinomiya (JP); Yoshiharu Yabuki, Minami-Ashigara (JP); Tomohiro Chino, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 10/528,772

(22) PCT Filed: Jul. 1, 2003

(86) PCT No.: PCT/JP03/08375

§ 371 (c)(1),
(2), (4) Date: Mar. 23, 2005

(87) PCT Pub. No.: WO2004/029166

PCT Pub. Date: Apr. 8, 2004

(65) Prior Publication Data

US 2006/0044375 A1    Mar. 2, 2006

(30) Foreign Application Priority Data

| Sep. 25, 2002 | (JP) | 2002-279393 |
| Sep. 27, 2002 | (JP) | 2002-282840 |
| Sep. 27, 2002 | (JP) | 2002-282841 |
| Sep. 30, 2002 | (JP) | 2002-285487 |
| Sep. 30, 2002 | (JP) | 2002-285488 |
| Sep. 30, 2002 | (JP) | 2002-287255 |

(51) Int. Cl.
*G01D 11/00* (2006.01)

(52) U.S. Cl. .............. 347/100; 347/95; 106/31.46

(58) Field of Classification Search ........... 347/100, 347/95, 96, 101; 106/31.27, 31.13, 31.46, 106/31.6; 523/160
See application file for complete search history.

(56) References Cited

U.S. PATENT DOCUMENTS

| 7,029,523 B2 * | 4/2006 | Taguchi et al. .......... 106/31.46 |
| 7,037,365 B2 * | 5/2006 | Taguchi et al. ............. 347/100 |
| 7,048,790 B2 * | 5/2006 | Taguchi et al. .......... 106/31.46 |

FOREIGN PATENT DOCUMENTS

| EP | 422668 A2 * | 4/1991 |
| EP | 597672 A2 | 5/1994 |
| EP | 1 391 488 A1 | 2/2004 |
| JP | 56-139568 A | 10/1981 |
| JP | 60-108481 A | 6/1985 |
| JP | 61-285275 A | 12/1986 |
| JP | 2-36276 A | 2/1990 |
| JP | 2-36277 A | 2/1990 |
| JP | 2-36278 A | 2/1990 |
| JP | 2-233782 A | 9/1990 |
| JP | 2-233783 A | 9/1990 |
| JP | 3-106974 A | 5/1991 |
| JP | 7-97541 A | 4/1995 |
| JP | 10-158560 A | 6/1998 |
| JP | 11-12514 A | 1/1999 |
| JP | 2002-167529 A | 6/2002 |
| WO | WO 97/16496 A1 | 5/1997 |

OTHER PUBLICATIONS

International Search Report for PCT/JP03/08375 dated Oct. 7, 2003.

* cited by examiner

*Primary Examiner*—Manish S. Shah
(74) *Attorney, Agent, or Firm*—Sughrue Mion, PLLC

(57) ABSTRACT

A black ink for inkjet recording having an aqueous medium containing a dye in which λmax of the absorption spectrum in an aqueous solution is in the region from 500 and 700 nm and the half-value width in the absorption spectrum of a dilute solution standardized to an absorbance of 1.0 is 100 nm or more. An object of the present invention is to provide an inkjet recording ink ensuring excellent discharge stability even after aging of the ink and also exhibiting excellent weather resistance.

18 Claims, No Drawings

BLACK INK FOR INKJET RECORDING AND INKJET RECORDING METHOD

TECHNICAL FIELD

The present invention relates to an inkjet recording ink and a recording method using the ink, more specifically, the present invention relates to an inkjet recording ink and an inkjet recording method, which can realize image drawing with high discharge stability and give an image having excellent preservability.

BACKGROUND ART

With recent popularization of computers, an inkjet printer is widely used for printing letters or drawing an image on paper, film, cloth or the like not only at offices but also at homes.

The inkjet recording method includes a system of discharging a liquid droplet by applying a pressure from a piezoelectric element, a system of discharging a liquid droplet by generating a bubble in the ink under heat, a system of using an ultrasonic wave, and a system of discharging a liquid droplet by suction using an electrostatic force. The inkjet recording ink used therefor includes an aqueous ink, an oily ink and a solid (fusion-type) ink.

Among these inks, the aqueous ink is relatively superior to oily ink or solid (fusion-type) ink in view of possibility of satisfying all of production, handleability, odor, safety and the like and therefore, is predominating as the inkjet recording ink at present.

The coloring material used in such an inkjet recording ink is required to have high solubility in a solvent (ink medium), enable high-density recording, provide good color hue, exhibit excellent fastness to light, heat, air, water and chemicals, ensure good fixing to an image-receiving material and less blurring, give an ink having excellent storability, have high purity and no toxicity, and be available at a low cost. Various dyes and pigments for use in inkjet recording have been already proposed and are actually used, but a coloring material satisfying all of the above-described requirements is not yet found out at present.

For example, conventionally well-known dyes and pigments such as coloring material having a color index (C.I.) number can hardly satisfy all of those various properties required of the inkjet recording ink.

With respect to the black dye for inkjet ink, food black-type dyes, naphthol-based direct azo dyes, acidic azo dyes and the like have been heretofore widely known.

Representative examples of the food black-type dye include C.I. Food Black 1 and C.I. Food Black 2, and techniques of using such a dye for the inkjet black ink are described in [Patent Document 1] to [Patent Document 3].

As for the acidic azo dye, techniques of using C.I. Acid Black 2, 31, 52, 140, 187 or the like for the inkjet black ink are described in [Patent Document 4] to [Patent Document 6], and as for the direct azo dye, techniques of using C.I. Direct Black 9, 17, 38, 51, 60, 102, 107, 122, 142, 154, 168 or the like for the inkjet black ink are described in [Patent Document 7] to [Patent Document 9].

Usually, the black color hue can be hardly covered by a single dye and a short-wave dye is preferably used in combination.

With respect to this short-wave dye, direct azo dyes, acidic azo dyes and the like are also widely known and techniques of using C.I. Acid Yellow 17, 23, 49, 194 or the like or C.I. Direct yellow 86, 120, 132, 144 or the lie for the inkjet black ink are described in [Patent Document 10] to [Patent Document 13]. Despite these techniques, the above-described properties required of the inkjet ink is demanded to be more enhanced.

The present inventors have made studies on the inkjet ink using a dye, but an aqueous black ink has a problem of low image durability. Furthermore, unlike carbon black, almost all black dyes when each used alone cannot provide a black image such as letters with high printing quality and as described above, a mixture of multiple dyes differing in the absorption spectrum is generally used. In this case, dyes mixed differ in the discoloration rate or the absorption waveform of the dye having broad absorption characteristics is changed due to discoloration, as a result, the quality of the image containing black is seriously impaired. Therefore, fastness of an image is particularly important.

In addition, the water-soluble black ink must have absorption characteristics covering the wavelength region over a wide range and in many cases, a high solid content concentration is required, but this brings about a problem that the discharge property of the ink tends to be worsened. Improvement is necessary also in this point.

As a result of intensive investigations, it has been found that addition of an amide-based compound is effective. However, in the case where a low-volatile organic solvent is present together in the ink, if a large amount of an amide-based compound is used in combination, the image formed is found to be readily blurred under high-humidity condition and an amide-based or analogous compound free from bleeding is demanded.

| | |
|---|---|
| [Patent Document 1] | JP-A-2-36276 (the term "JP-A" as used herein means an "unexamined published Japanese patent application") |
| [Patent Document 2] | JP-A-2-233782 |
| [Patent Document 3] | JP-A-2-233783 |
| [Patent Document 4] | JP-A-60-108481 |
| [Patent Document 5] | JP-A-2-36277 |
| [Patent Document 6] | JP-A-2-36278 |
| [Patent Document 7] | JP-A-56-139568 |
| [Patent Document 8] | JP-A-61-285275 |
| [Patent Document 9] | JP-A-3-106974 |
| [Patent Document 10] | JP-A-7-97541 |
| [Patent Document 11] | WO97/16496 |
| [Patent Document 12] | JP-A-10-158560 |
| [Patent Document 13] | JP-A-11-12514 |

An object of the present invention is to solve the problems of the black ink and the like for inkjet recording described in the Background Art, more specifically, to provide an inkjet recording ink, particularly, black ink, ensuring excellent discharge stability even after aging of the ink and also exhibiting excellent weather resistance of causing no aging deterioration of the image quality.

DISCLOSURE OF THE INVENTION

These objects of the present invention can be attained by the inkjet recording ink described in the following (1) to (16). This inkjet recording ink is used for inkjet recording performed by the method described in (17) below. In particular, the effect of the present invention is remarkably brought out when the image recording is performed on the image-receiving layer of the image recording material described in (18) below.

(1) A black ink for inkjet recording, comprising an aqueous medium having dissolved or dispersed therein at least one dye in which λmax of the absorption spectrum in an aqueous solution is in the region from 500 and 700 nm and the half-value width in the absorption spectrum of a dilute solution standardized to an absorbance of 1.0 is 100 nm or more.

(2) The black ink for inkjet recording as described in (1) above, which comprises an aqueous medium having dissolved or dispersed therein at least one dye in which λmax of the absorption spectrum in an aqueous solution is in the region from 500 and 700 nm and the half-value width in the absorption spectrum of a dilute solution standardized to an absorbance of 1.0 is 100 nm or more, and at least one dye contained in the ink has an oxidation potential positive than 1.0 V (vs SCE).

(3) The black ink for inkjet recording as described in (1) or (2) above, wherein the ink comprises an aqueous medium having dissolved or dispersed therein at least one dye in which λmax of the absorption spectrum in an aqueous solution is in the region from 500 and 700 nm, the half-value width in the absorption spectrum of a dilute solution standardized to an absorbance of 1.0 is 100 nm or more, and the oxidation potential is positive than 1.0 V (vs SCE).

(4) The black ink for inkjet recording as described in any one of (1) to (3) above, wherein when a black square symbol of JIS code 2223 is printed in a 48-point size and the density of a selected portion having a visual reflection density ($D_{vis}$) of 0.90 to 1.10 on the printed face is defined as the initial density and when this printed matter is enforcedly discolored by using an ozone discoloration tester capable of constantly generating 5 ppm of ozone and the enforced discoloration rate constant ($k_{vis}$) is determined by applying a first-order chemical reaction rule to the relationship of reflection density-time until the visual reflection density ($D_{vis}$) decreases to 80% of the initial density, the enforced discoloration rate constant ($k_{vis}$) is $5.0 \times 10^{-2}$ [hour$^{-}$] or less.

(5) The black ink for inkjet recording as described in any one of (1) to (4) above, wherein when a black square symbol of JIS code 2223 is printed in a 48-point size and the densities of selected C, M and Y three color portions each having a reflection density ($D_R$, $D_G$, $D_B$) of 0.90 to 1.10 as measured with status A filter light are defined as the initial densities and when this printed matter is enforcedly discolored by using an ozone discoloration tester capable of constantly generating 5 ppm of ozone and three enforced discoloration rate constants ($k_R$, $k_G$, $k_B$) are determined by applying a first-order chemical reaction rule to the relationship of reflection density-time until the reflection densities ($D_R$, $D_G$, $D_B$) decrease to 80% of respective initial densities, the ratio (R) of the maximum value to the minimum value of these three rate constants is 1.2 or less.

(6) The black ink for inkjet recording as described in any one of (1) to (5) above, wherein the dye in which λmax of the absorption spectrum in an aqueous solution is in the region from 500 and 700 nm and the half-value width in the absorption spectrum of a dilute solution standardized to an absorbance of 1.0 is 100 nm or more is a dye represented by the following formula (1):

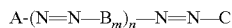

Formula (1):

wherein A, B and C each independently represents an aromatic or heterocyclic group which may be substituted, and m and n each represents 0 or an integer of 1 or more.

(7) The black ink for inkjet recording as described in any one of (1) to (6) above, which comprises at least one compound represented by formula (A):

Formula (A):

wherein X represents a group represented by—N(Q$_1$)-Q$_2$, Z represents a group represented by —N(Q$_1$)-Q$_2$ or —O-Q$_3$, Y represents a group represented by —W-(G)$_k$-(H)$_n$—, W and/or H represents a group represented by —CO—, —SO$_2$— or —PO(Q$_4$)-, G represents a divalent linking group, Q$_1$ to Q$_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

(8) The black ink for inkjet recording as described in any one of (1) to (7) above, which further comprises at least one dye having λmax of the region from 350 to 500 nm.

(9) The black ink for inkjet recording as described in (8) above, wherein the at least one dye having λmax of the region from 350 to 500 nm is a dye represented by formula (1).

(10) The black ink for inkjet recording as described in (9) above, which comprises at least one dye having λmax of the region from 500 to 700 nm and the at least one dye having λmax of the region from 350 to 500 nm, wherein the dyes both have an oxidation potential positive than 1.0 V (vs SCE) and both are a dye represented by formula (1).

(11) The black ink for inkjet recording as described in (9) or (10) above, which comprises at least one dye having λmax of the region from 500 to 700 nm and the at least one dye having λmax of the region from 350 to 500 nm, wherein the dyes both have an enforced discoloration rate constant ($k_{vis}$) defined in (5) above of $5.0 \times 10^{-2}$ [hour$^{-1}$] or less and both are a dye represented by formula (1).

(12) The black ink for inkjet recording as described in any one of (1) to (11) above, which comprises at least one organic solvent not containing a heteroatom other than an oxygen atom.

(13) The black ink for inkjet recording as described in any one of (1) to (12) above, which comprises an aqueous medium having dissolved and/or dispersed therein at least two dyes each having: λmax of the region from 500 to 700 nm; and the half-value width of 100 nm or more in the absorption spectrum of a dilute solution standardized to an absorbance of 1.0.

(14) The black ink for inkjet recording as described in any one of (1) to (13) above, wherein a water-soluble organic solvent having a boiling point of 150° C. or more is used.

(15) The black ink for inkjet recording as described in any one of (1) to (14) above, wherein the organic solvent used for the ink comprises at least one organic solvent having a boiling point of 150° C. or more and at least one organic solvent having a boiling point of 150° C. or less.

(16) The black ink for inkjet recording as described in any one of (1) to (15) above, which comprises: a water-miscible organic solvent having a boiling point of 100° C. or more in an amount of 20 mass % or more based on the entire amount of the ink; and the compound represented by formula (A) in an amount of 0.02 to 2 mass % based on the entire amount of the ink.

(17) An inkjet recording method comprising using the inkjet recording ink described in any one of (1) to (16) above.

(18) The inkjet recording method as described in (17) above, comprising discharging ink droplets according to recording signals on an image-receiving material to record an image on the image-receiving material, the image-receiving material comprising a support having thereon an image-receiving layer containing inorganic white pigment particles, wherein the ink droplet comprises the ink for inkjet recording described in any one of (1) to (16) above.

That is, the dye for use in the black ink for inkjet recording of the present invention is a dye in which λmax of the absorption spectrum in an aqueous solution is in the region from 500 to 700 nm and the half-value width in the absorption spectrum in a dilute solution standardized to an absorbance of 1.0 is 100 nm or more. The black ink obtained by dissolving or dispersing this dye in an aqueous medium has an appropriate and wide spectral absorption wavelength region to allow for no waste of the dye amount used and therefore, can ensure discharge stability and fastness of image both in a high level.

In the case where the dye having the above-described spectral absorption characteristics contained in the ink of the present invention has an oxidation potential positive than 1.0 V (vs SCE), the fastness of the ink to oxidation is more enhanced and this is preferred. In addition to the noble oxidation potential, when the image-drawn area of visually neutral color (so-called gray) has an enforced discoloration rate ($k_{vis}$) of $5.0 \times 10^{-2}$ [hours$^{-1}$] or less for ozone, higher fastness to oxidation is obtained.

In addition to the low discoloration rate constant ($k_{vis}$), when the ratio (R) of the maximum value to the minimum value of the enforced discoloration rate constants ($k_R$, $k_G$, $k_B$) of C, M and Y three colors is 1.2 or less, the visually recognized fastness of image is still more enhanced. This effect is presumed to result because since the fastness of image is affected also by the change in color balance, the balanced fastness among constituent dyes brings about enlargement of tolerance in view of visual sensitivity.

As for the dye having the above-described spectral absorption characteristics, oxidation resistance and spectral wavelength dependency, the dye represented by formula (1) is particularly excellent.

BEST MODE FOR CARRYING OUT THE INVENTION

Specific embodiments of the present invention are described in detail below.

In the description of the present invention, the "dye" is used in a wide sense and as long as no question arises, this term indicates collectively a water-soluble dye (dye in a narrow sense) and a pigment dispersible in an aqueous medium.

In the present invention, the "image-receiving medium" such as recording paper or film is sometimes referred to as "media" according to usage in this industry.

In the black ink for inkjet recording of the present invention, a dye (L) having Dmax (maximum absorption wavelength) in the region from 500 to 700 nm with the half-value width in the absorption spectrum of a dilute solution standardized to an absorbance of 1.0 being 100 nm or more (preferably from 120 to 500 nm, more preferably from 120 to 350 nm) is used.

In the case where the dye (L) by itself can realize black with high image quality (no loosening), that is, visually neutral black not dependent on the light source at the observation and less emphasized in any one color tone of B, G and R, this dye may be used alone as the dye for black ink. However, in general, a dye for covering the absorbency in the region where the dye (L) has low absorption is usually used in combination. A dye (S) having main absorption in the spectral region of blue light is preferably used in combination. The black ink can also be produced by using other dyes in combination.

In the present invention, the above-described dye alone or in combination with other dyes is dissolved or dispersed in an aqueous medium to prepare the black ink and in order to satisfy the performances preferred as the black ink for inkjet recording, namely, 1) the weather resistance is excellent and/or 2) the balance of black (visual neutrality) is not disrupted even after discoloration, the ink of the present invention preferably satisfies the following four conditions.

The black ink of the present invention is preferably an ink such that the enforced discoloration rate constant ($k_{vis}$) obtained by printing a black square symbol of JIS code 2223 in a 48-point size and measuring the reflection density ($D_{vis}$) in the printed letter area is $5.0 \times 10^{-2}$ [hour$^{-1}$] or less, more preferably $3.0 \times 10^{-2}$ [hour$^{-1}$] or less, still more preferably $1.0 \times 10^{-2}$ [hour$^{-1}$] or less (condition 1).

In the present invention, the enforced discoloration rate constant of the ink is a rate constant determined by the following method. An image is printed on a reflective image-receiving medium by using only the ink to be measured out of the ink set, the reflection density (according to International Standard ISO5/3) of the obtained image is measured, the colored region having a reflection density of 0.90 to 1.10 is selected as the initial density point, the image is discolored by using an ozone discoloration tester capable of constantly maintaining an ozone concentration of 5 mg/L, the time until the density decreases to 80% of the initial density is measured by using the initial density as the starting density (=100%), and on the assumption that the relationship between the residual dye and the time follows the first-order reaction rate equation (the relationship between the discoloration density and the time follows the linear expression), the discoloration rate constant is determined from the time spent to reach 80%. Accordingly, the determined discoloration rate constant is a discoloration rate constant in the colored region of the image printed with the ink, but in the present invention, this value is used as the discoloration rate constant of the ink.

Also, the black ink of the present invention is preferably an ink such that when the ratio (R) of the maximum value to the minimum value of the enforced discoloration rate constants ($k_R$, $k_G$, $k_B$) of C, M and Y three colors is determined (for example, in the case where $k_R$ is a maximum value and $k_G$ is a minimum value, $R=k_R/k_G$), the ratio (R) is 1.2 or less, more preferably 1.1 or less, still more preferably 1.05 or less (condition 2).

The enforced discoloration rate constants ($k_R$, $k_G$, $k_B$) of C, M and Y three colors are determined as follows. A black square symbol of JIS code 2223 is printed in a 48-point size, the reflection densities ($D_R$, $D_G$, $D_B$) of C, M and Y three colors are measured through a Status A filter, the densities of the colored regions each having a reflection density of 0.90 to 1.10 are defined as initial densities, the printed matter is discolored similarly to the above by using an ozone discoloration tester capable of constantly generating 5 ppm of ozone, the time until the reflection densities ($D_R$, $D_G$, $D_B$) decrease to 80% of respective initial density values is determined, and on the assumption that the relationship between the residual dye and the time follows the first-order reaction rate equation (the relationship between the discoloration density and the time follows the linear expression), the discoloration rate constants are determined from the time spent to reach 80%. Accordingly, the determined discoloration rate constant is a discoloration rate constant in the colored region of the image printed, but in the present invention, this value is used as the discoloration rate constant of the ink.

Incidentally, the "printed matter obtained by printing a black square symbol of JIS code 2223 in a 48-point size" used here is of course, similarly to the above, an image printed in a size large enough to cover the aperture of the densitometer.

Furthermore, the black ink of the present invention is preferably an ink such that at least one dye contained has an oxidation potential positive than 1.00 V (vs SCE), more preferably positive than 1.10 V (vs SCE), still more preferably positive than 1.20 V (vs SCE), and most preferably positive than 1.25 V (vs SCE), and at least one of these dyes has λmax of 500 nm or more (condition 3).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, a test sample is dissolved to a concentration of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry or a direct current polarography. This value sometimes deviates on the order of tens of millivolt due to the effect of liquid junction potential, liquid resistance of sample solution, or the like, but by adding a standard sample (for example, hydroquinone), the reproducibility of potential can be guaranteed and at the same time, a correct oxidation potential can be obtained irrespective of difference in the sweeping method of cyclic voltammetry, direct current polarography or the like or in the electrode.

In order to univocally specify the potential, in the present invention, the value (vs SCE) measured by a direct current polarography in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler when an electron-withdrawing group is introduced, and becomes baser when an electron-donating group is introduced. In the present invention, the oxidation potential is preferably rendered nobler by introducing an electron-withdrawing group into the black dye skeleton so as to reduce the reactivity with ozone which is an electrophilic agent.

In addition, the black ink of the present invention is preferably an ink produced by using an azo dye represented by formula (1). The azo dye represented by formula (1) includes those coming under the dye (L) having λmax in the region from 500 to 700 nm with the half-value width in the absorption spectrum of a dilute solution standardized to an absorbance of 1.0 being 100 nm or more. Other than these, a dye (S) having λmax in the region from 350 to 500 nm is also included in the dye represented by formula (1). An ink where at least one dye (L) is the dye of formula (1) is preferred, an ink where at least one dye (L) and at least one dye (S) are the dye of formula (1) is more preferred, and an ink where 90 mass % of all dyes in the ink is occupied by the dye of formula (1) is still more preferred (condition 4).

The black ink of the present invention is a black ink satisfying at least one of these conditions 1 to 4.

Out of the dyes represented by formula (1), the dye comes under the dye (L) is described in detail below.

In formula (1), A, B and C each independently represents an aromatic group which may be substituted, or a heterocyclic group which may be substituted (A and C are a monovalent group and B is a divalent group), and m and n each represents 0 or an integer of 1 or more.

In particular, a compound where m and n each is 1 or 2 is preferred, and in this case, at least two or more of A, B and C are preferably an unsaturated heterocyclic group which may be substituted. A compound where m and n each is 1 and at least B and C are an unsaturated heterocyclic group is more preferred.

The azo dye represented by formula (1) is preferably a dye represented by the following formula (2):

Formula (2):

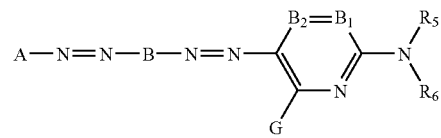

wherein $B_1$ and $B_2$ each represents $=CR_1—$ or $—CR_2=$ or either one of $B_1$ and $B_2$ represents a nitrogen atom and the other represents $=CR_1—$ or $—CR_2=$, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group or a sulfo group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, and each group may further have a substituent, provided that $R_5$ and $R_6$ are not a hydrogen atom at the same time, and $R_1$ and $R_5$, or $R_5$ and R6 may combine to form a 5- or 6-membered ring.

The azo dye represented by formula (2) is more preferably a dye represented by the following formula (3):

Formula (3):

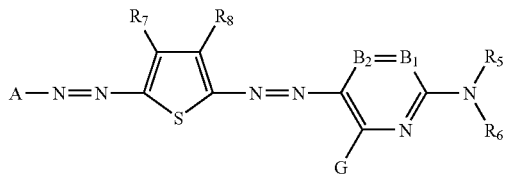

wherein $R_7$ and $R_8$ each has the same meaning as $R_1$ in formula (2).

The halogen atom includes a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-(3-sulfopropylamino)phenyl group. The divalent aromatic group is a divalent form of these monovalent aromatic groups and examples thereof include a phenylene group, a p-tolylene group, a p-methoxyphenylene group, an o-chlorophenylene group, an m-(3-sulfopropylamino)phenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkyl- or aryl-sulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, 2-benzothiazolyl group, a 2-benzoxazolyl group and a 2-furyl group.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an ionic hydrophilic group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an ionic hydrophilic group. Examples of the alkylamino group include a methylamino group and a diethylamino group.

The arylamino group includes an arylamino group having a substituent, an unsubstituted arylamino group and an anilino group. The arylamino group is preferably an arylamino group having from 6 to 20 carbon atoms. Examples of the substituent include a halogen atom and an ionic hydrophilic group. Examples of the arylamino group include an anilino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an ionic hydrophilic group. Examples of the aryloxycarbonylamino group include a phenoxycarbonylamino group.

The alkyl- or aryl-sulfonylamino group includes an alkyl- or aryl sulfonylamino group having a substituent and an unsubstituted alkyl- or aryl-sulfonylamino group. The sulfonylamino group is preferably a sulfonylamino group having from 1 to 20 carbon atoms. Examples of the substituent include an ionic hydrophilic group. Examples of these sulfonylamino groups include a methylsufonylamino group, an N-phenylmethylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an ionic hydrophilic group. Examples of the heterocyclic sulfinyl group include a 4-pyridinesulfinyl group.

The alkyl-, aryl- or heterocyclic-thio group includes an alkyl-, aryl- or heterocyclic-thio group having a substituent and an unsubstituted alkyl-, aryl- or heterocyclic-thio group. The alkyl-, aryl- or heterocyclic-thio group is preferably an alkyl-, aryl- or heterocyclic-thio group having from 1 to 20 carbon atoms. Examples of the substituent include an ionic hydrophilic group. Examples of the alkyl-, aryl- or heterocyclic-thio group include a methylthio group, a phenylthio group and a 2-pyridylthio group.

The alkyl- or aryl-sulfonyl group includes an alkyl- or aryl-sulfonyl group having a substituent and an unsubstituted alkyl- or aryl-sulfonyl group. Examples of the alkyl- or aryl-sulfonyl group include a methylsulfonyl group and a phenylsulfonyl group.

The alkyl- or aryl-sulfinyl group includes an alkyl- or aryl-sulfinyl group having a substituent and an unsubstituted alkyl- or aryl-sulfinyl group. Examples of the alkyl- or aryl-sulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Formulae (1), (2) and (3) are described in more detail below. In the following, those described above for each group or substituent also apply.

In formula (1), A, B and C each independently represents an aromatic group (A and C are a monovalent aromatic group such as aryl group, and B is a divalent aromatic group such as arylene group) which may be substituted, or a heterocyclic group (A and C are a monovalent heterocyclic group and B is a divalent heterocyclic group) which may be substituted. Examples of the aromatic ring include a benzene ring and a naphthalene ring. Examples of the heteroatom in the heterocyclic ring include N, O and S. The heterocyclic ring may be condensed with an aliphatic ring, an aromatic ring or another heterocyclic ring.

The substituent may be an arylazo group or a heterocyclic azo group.

At least two of A, B and C are preferably a heterocyclic group.

The heterocyclic group of C is preferably an aromatic nitrogen-containing 6-membered heterocyclic group represented by the following formula (4). When C is an aromatic nitrogen-containing 6-membered heterocyclic group represented by formula (4), formula (1) corresponds to formula (2).

Formula (4):

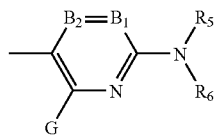

In formula (4), $B_1$ and $B_2$ each represents =$CR_1$— or —$CR_2$= or either one of $B_1$ and $B_2$ represents a nitrogen atom and the other represents =$CR_1$— or —$CR_2$=. $B_1$ and $B_2$ each is preferably =$CR_1$— or —$CR_2$=.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group or an alkyl- or aryl-sulfonyl group, more preferably a hydrogen atom, an aromatic group, a heterocyclic group, an acyl group, or an alkyl- or aryl-sulfonyl group, and most preferably a hydrogen atom, an aryl group or a heterocyclic group, and each group may further have a substituent. However, $R_5$ and $R_6$ are not a hydrogen atom at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group or a sulfo group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkyl- or aryl-thio group or a heterocyclic thio group, more preferably a hydrogen atom, a halogen atom, an alkyl group, a hydroxy group, an alkoxy group, an aryloxy group, an acyloxy group, an amino group (including an anilino group and a heterocyclic amino group) or an acylamino group, and most preferably a hydrogen atom, an anilino group or an acylamino group, and each group may further have a substituent.

The substituents represented by $R_1$ and $R_2$ each is preferably a hydrogen atom, an alkyl group, a halogen atom, an alkoxycarbonyl group, a carboxyl group, a carbamoyl group, a hydroxy group, an alkoxy group or a cyano group, and each group may further have a substituent.

$R_1$ and $R_5$, or $R_5$ and $R_6$ may combine to form a 5- or 6-membered ring.

When the substituents represented by A, $R_1$, $R_2$, $R_5$, $R_6$ and G each further has a substituent, examples of the substituent include the substituents described above for G, $R_1$ and $R_2$. Also, an ionic hydrophilic group is preferably further present as a substituent on any one position of A, $R_1$, $R_2$, $R_5$, $R_6$ and G.

Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

When B has a ring structure, preferred examples of the heterocyclic ring include a thiophene ring, a thiazole ring, an imidazole ring, a benzothiazole ring and a thienothiazole ring. Each heterocyclic group may further have a substituent. Among these heterocyclic rings, a thiophene ring, a thiazole ring, an imidazole ring, a benzothiazole ring and a thienothiazole ring represented by the following formulae (a) to (e) are preferred. When B is a thiophene ring represented by formula (a) and C is a structure represented by formula (4), formula (1) corresponds to formula (3).

(a)

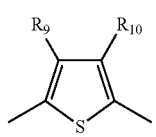

(b)

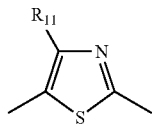

-continued

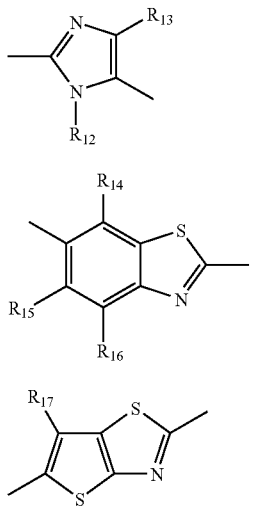

wherein $R_9$ to $R_{17}$ each represents a substituent having the same meaning as G, $R_1$ and $R_2$ in formula (2).

In the present invention, particularly preferred is a structure represented by the following formula (5):

Formula (5):

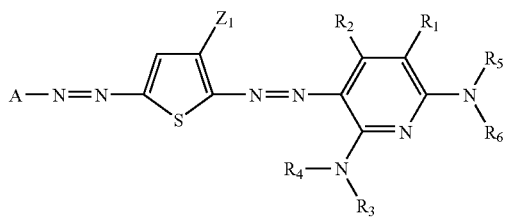

In formula (5), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_1$, $R_2$, $R_5$ and $R_6$ have the same meanings as in formula (2). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, preferably a hydrogen atom, an aromatic group, a heterocyclic group, an acyl group, or an alkyl- or aryl-sulfonyl group, more preferably a hydrogen atom, an aromatic group or a heterocyclic group.

The groups described in regard to formula (5) each may further have a substituent. When these groups each further has a substituent, examples of the substituent include the substituents described in regard to formula (2), the groups described for G, $R_1$ and $R_2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96-103, Nankodo (1979). In the present invention, each substituent is limited or described by using the Hammett's substituent constant $σ_p$ but this does not mean that the substituent is limited only to those having a known value which can be found in the above-described publications. Needless to say, the substituent includes substituents of which $σ_p$ value is not known in publications but when measured based on the Hammett's rule, falls within the range specified. Furthermore, although formulae (1) and (2) of the present invention include those which are not a benzene derivative, the $σ_p$ value is used as a measure for showing the electron effect of the substituent irrespective of the substitution site. In the present invention, the $σ_p$ value is used in this meaning.

Examples of the electron-withdrawing group having a Hammett's substituent constant $σ_p$ value of 0.60 or more include a cyano group, a nitro group, an alkylsulfonyl group (e.g., methanesulfonyl) and an arylsulfonyl group (e.g., benzenesulfonyl).

Examples of the electron-withdrawing group having a Hammett's $σ_p$ value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant $σ_p$ value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a $σ_p$ value of 0.15 or more (e.g., 2,4-dinitrophenyl, pentachloro-phenyl) and a heterocyclic ring (e.g., 2-benzoxazolyl, 2-benzothiazolyl, 1-phenyl-2-benzimidazolyl).

Specific examples of the electron-withdrawing group having a $σ_p$ value of 0.20 or more include, in addition to those described above, a halogen atom.

The preferred combination of substituents in the azo dye represented by formula (3) is described below. $R_5$ and $R_6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_5$ and $R_6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B_1$ and $B_2$ each is =$CR_1$— or —$CR_2$=, and $R_1$ and $R_2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are set forth below, but the azo dye for use in the present invention is not limited to those shown below. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

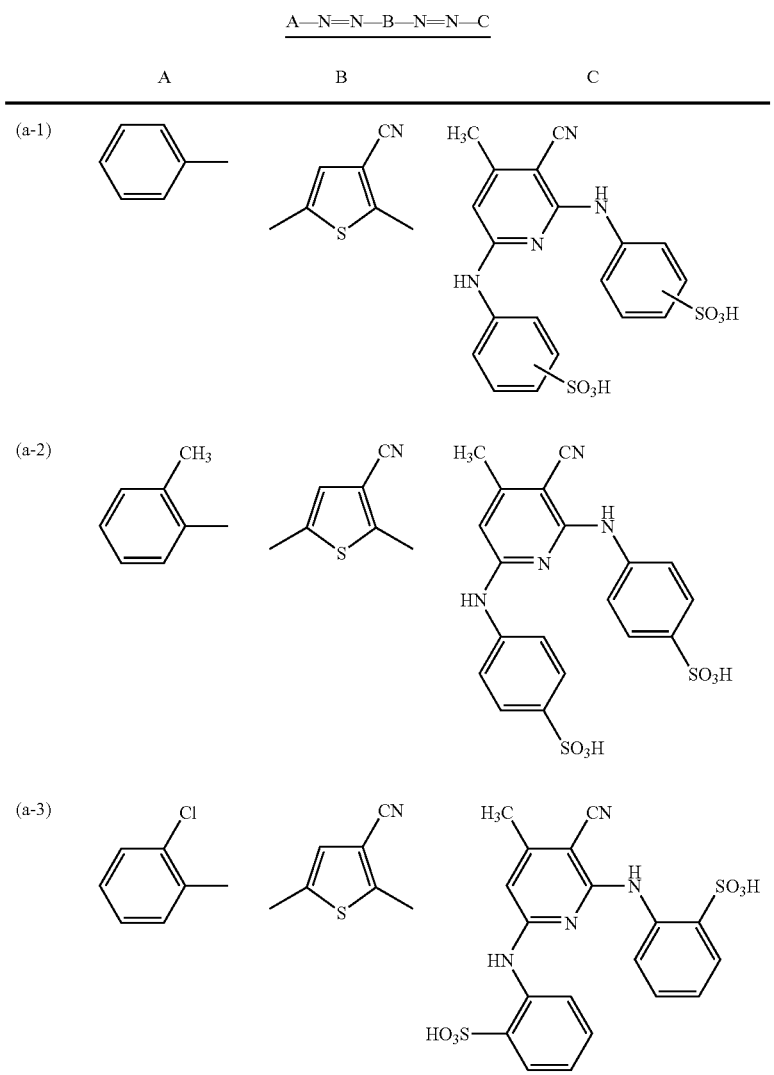

-continued
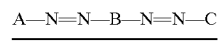
| A | B | C |
|---|---|---|
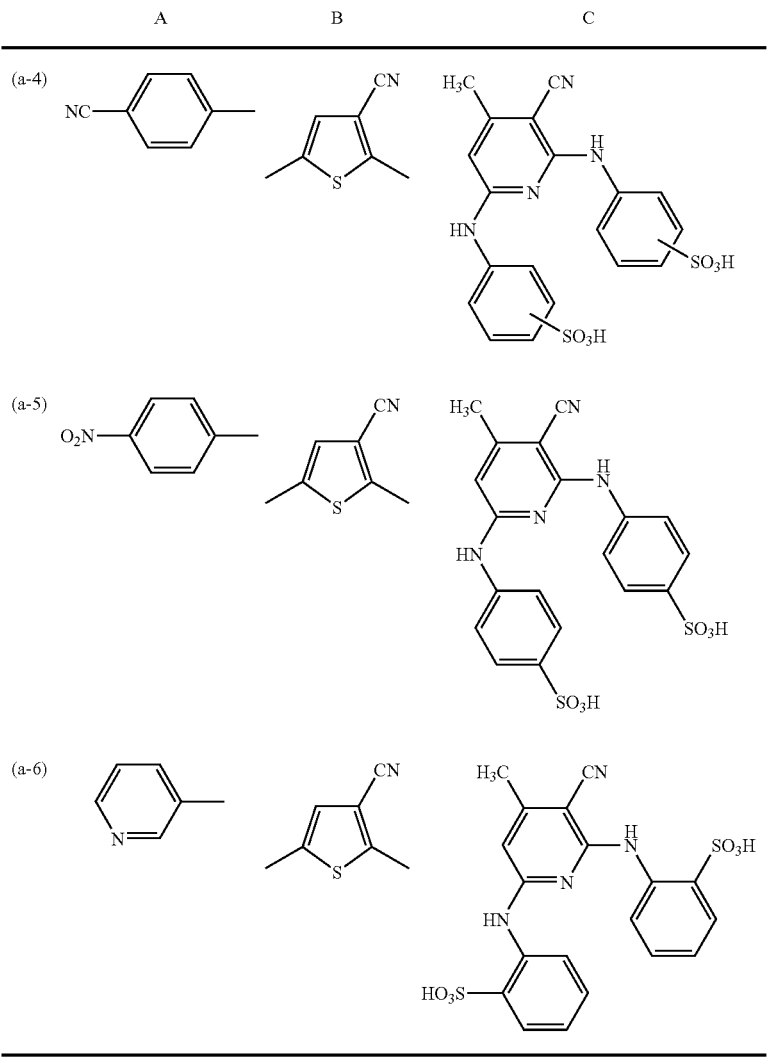
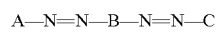
| A | B | C |
|---|---|---|
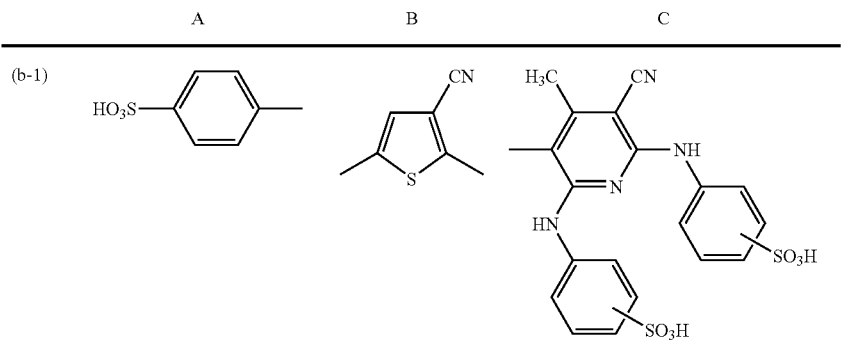

-continued
| | A | B | C |
|---|---|---|---|
A—N=N—B—N=N—C
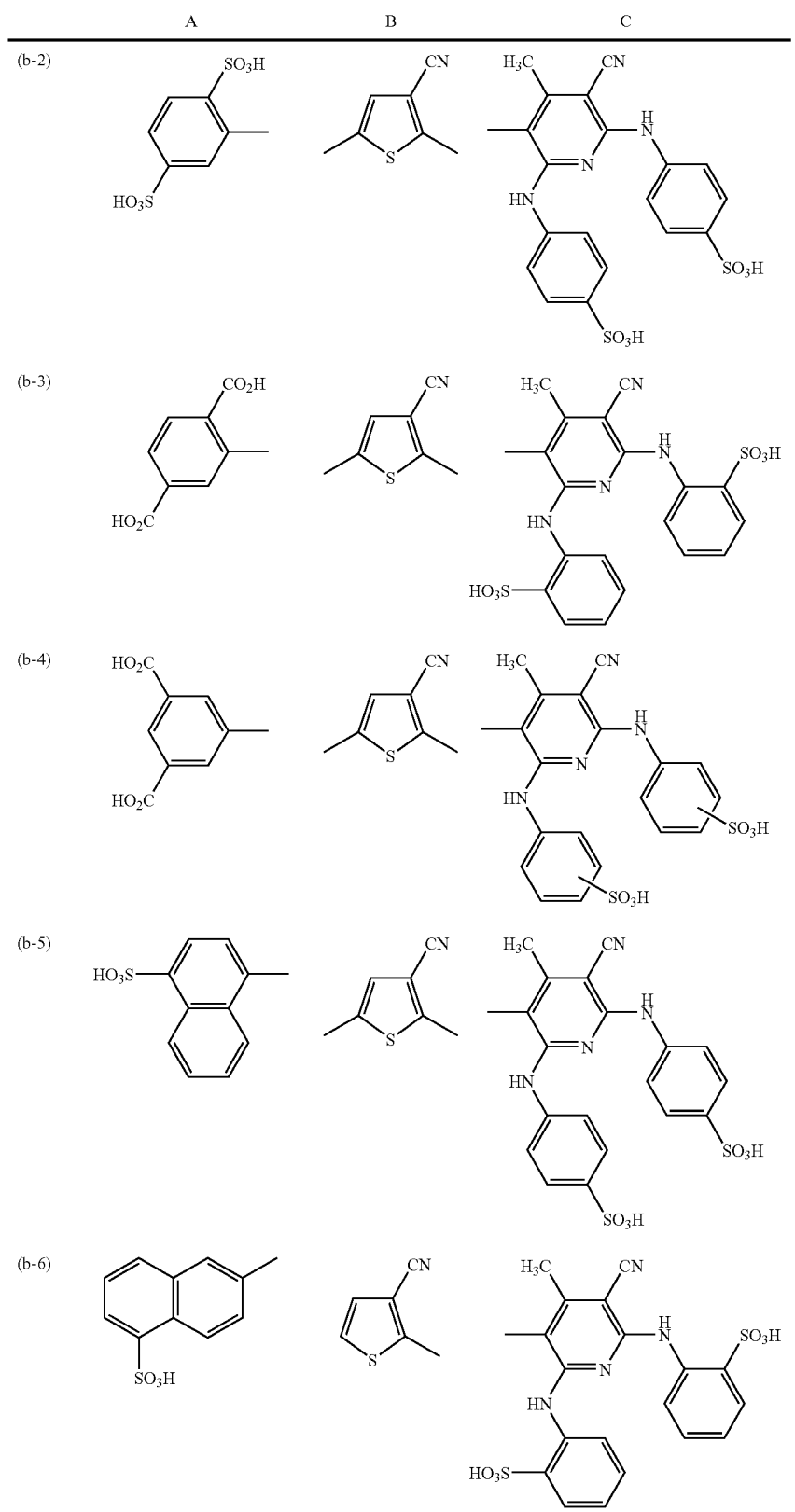
(b-2)
(b-3)
(b-4)
(b-5)
(b-6)

-continued
| | A | B | C |
|---|---|---|---|
| | | A—N=N—B—N=N—C | | |
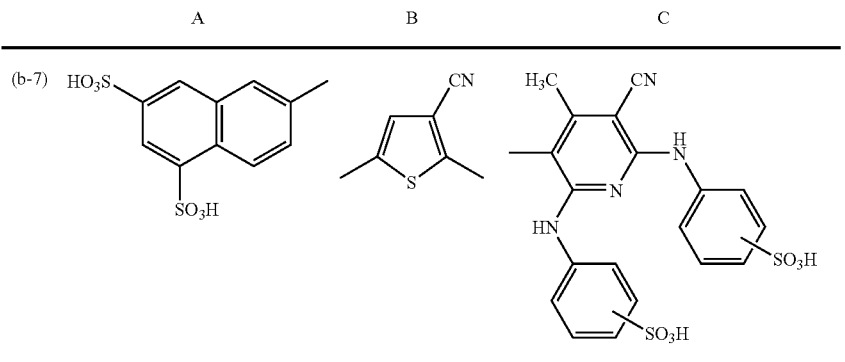
| | A | B | C |
|---|---|---|---|
| | | A—N=N—B—N=N—C | | |
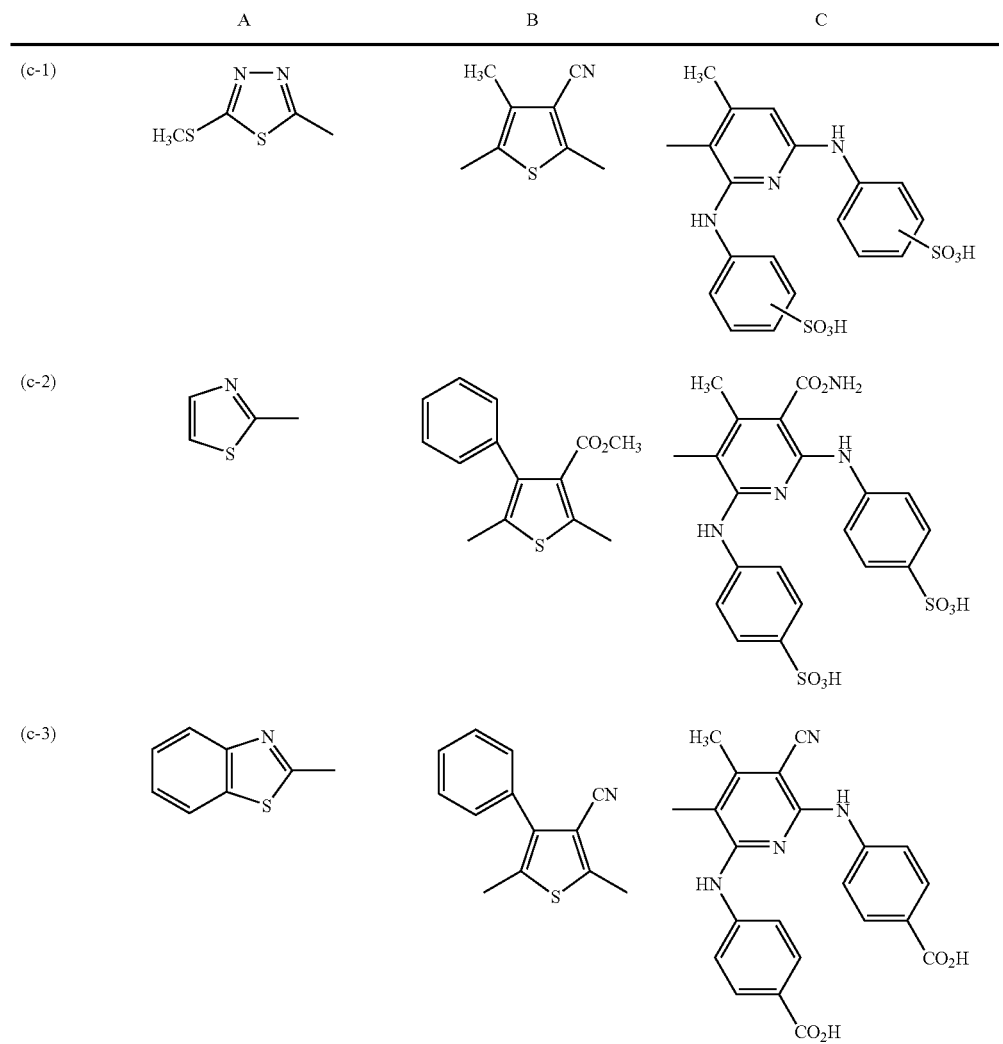

-continued
| | A | B | C |
|---|---|---|---|
| (c-4) | 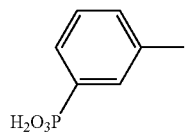 | 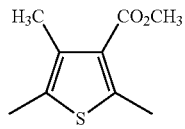 | 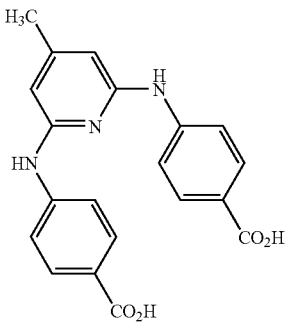 |
| (c-5) | 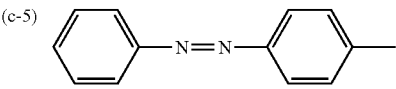 | 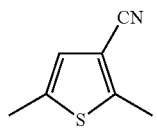 | 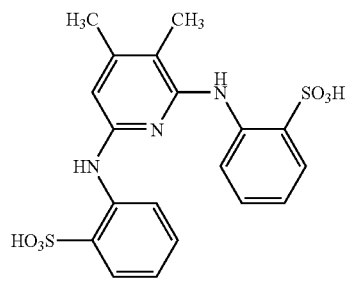 |
A—N=N—B—N=N—C
| | A | B | C |
|---|---|---|---|
| (d-1) | 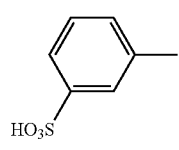 | 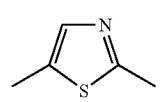 | 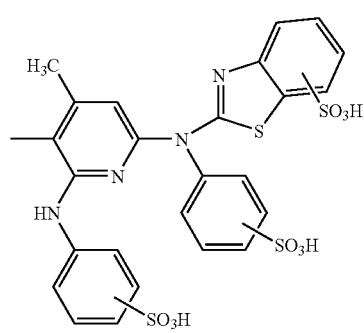 |
| (d-2) | 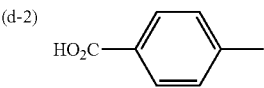 | 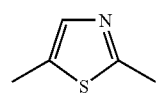 | 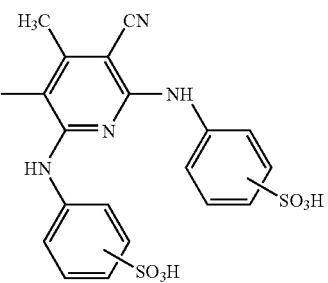 |

-continued
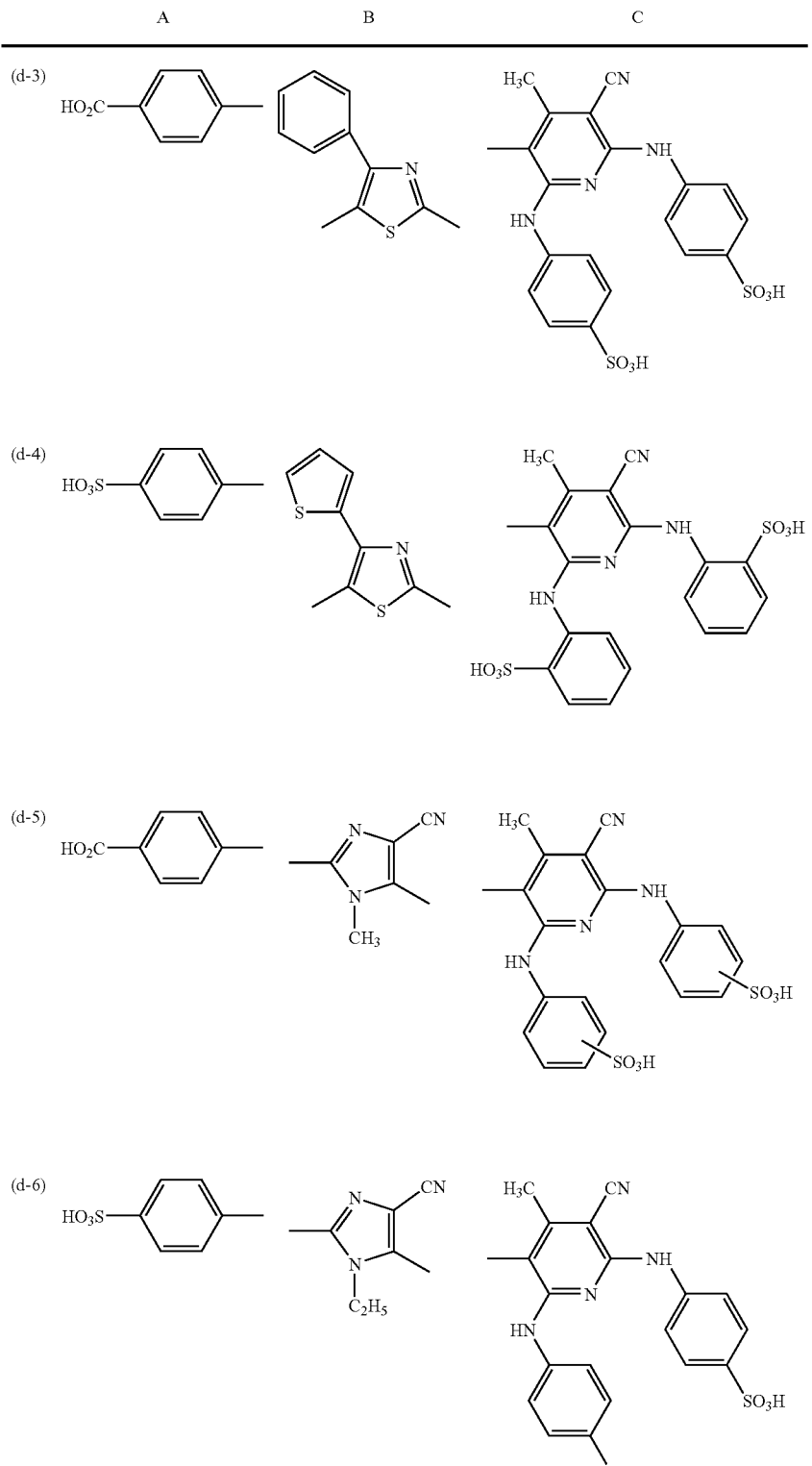

| | A—N=N—B—N=N—C | |
|---|---|---|
| A | B | C |
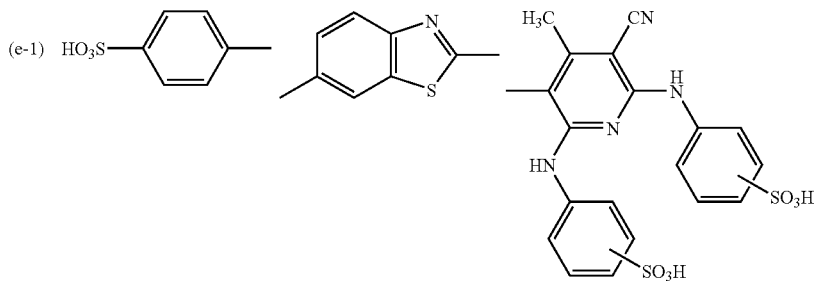
(e-1)
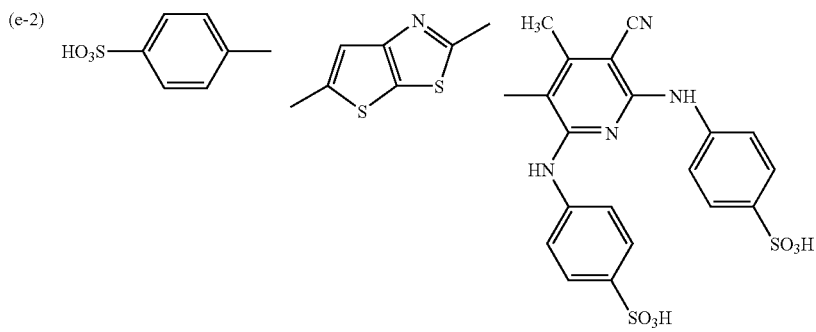
(e-2)
| | A—N=N—B—N=N—C | |
|---|---|---|
| A | B | C |
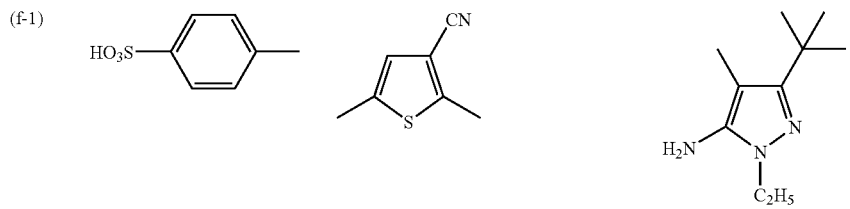
(f-1)
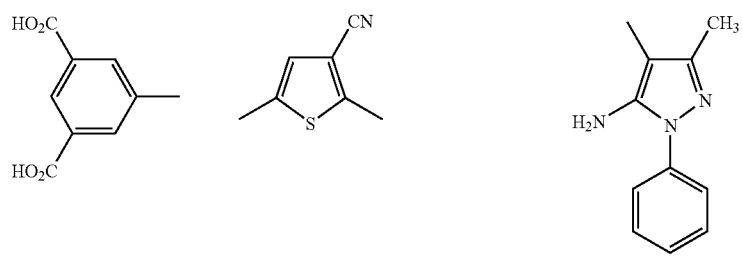
(f-2)

-continued

A—N=N—B—N=N—C

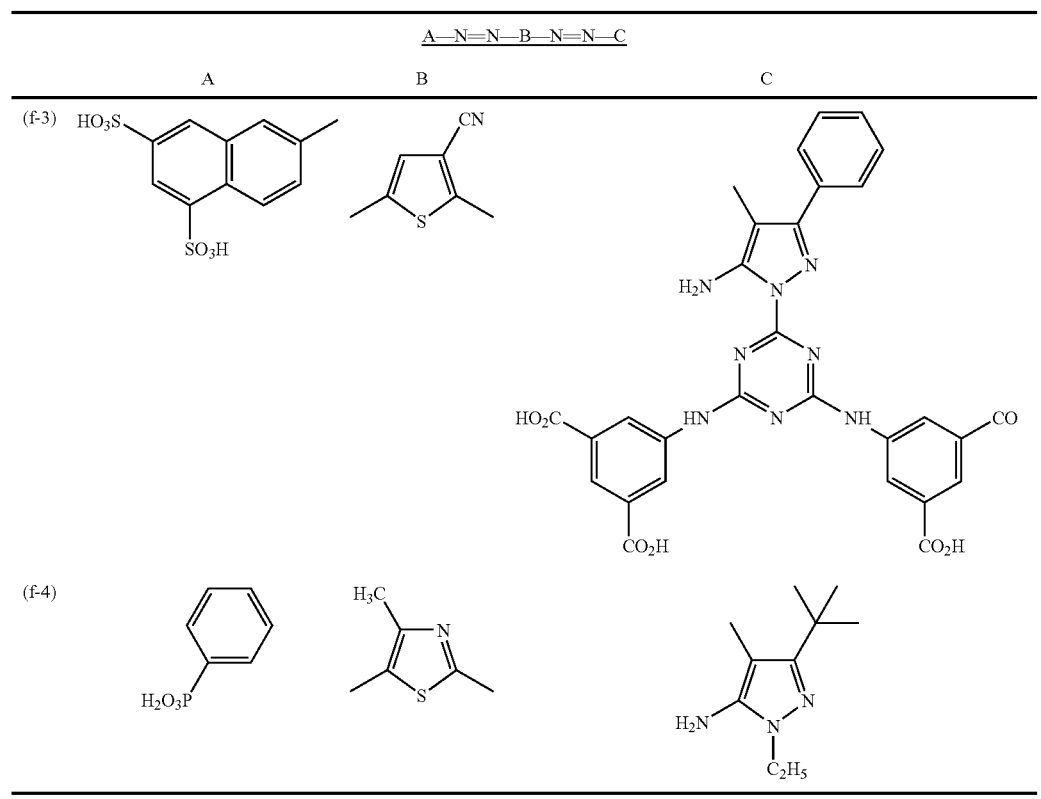

The dyes represented by formulae (1), (2), (3) and (5) can be synthesized by a coupling reaction of a diazo component and a coupler. As the main synthesis method, the methods described in JP-A-2-24191, JP-A-2001-279145 and Japanese Patent Application No. 2000-124832 can be used for the synthesis.

The ink composition for inkjet recording of the present invention contains the azo dye represented by formula (1), (2), (3) or (5) preferably in an amount of 0.2 to 20 mass %, more preferably from 0.5 to 15 mass %. Two or more azo dyes (L) represented by the formula may be used in combination and this is preferred because the solubility is less restricted.

In the case where the dye (L) by itself can realize "(non-loosening) black" with high image quality, that is, black not dependent on the light source at the observation and less emphasized in any one color tone of B, G and R, this dye may be used alone as the dye for black ink, but in general, a dye for covering the region where the dye (L) has low absorption is usually used in combination. A dye or pigment having main absorption in the yellow region is usually used in combination to realize preferred black. As for the yellow dye, commonly employed direct dyes, acid dyes and the like, as represented by azo dyes and azomethine dyes, can be used. As for the pigment, an aqueous dispersion of a general pigment having a pigment number can be used in combination. In particular, a dye represented by formula (1) is preferably used as the short-wave dye (S) described above.

Among the dyes represented by formula (1), an azo dye where m=n=0 is preferred as the short-wave dye (S). At this time, A and C each is preferably a heteroaromatic ring. An azo dye where m=n=1 is next preferred.

In either case, the dye preferably has an oxidation potential (Eox) of 1.0 V (vs SCE), more preferably 1.2 V (vs SCE).

The black ink can also be produced by using other dyes in combination.

The black ink for inkjet recording of the present invention contains the dye of formula (1) in an amount of 0.2 to 25 mass %, preferably from 0.5 to 15 mass %, based on the entire ink.

The ink composition of the present invention preferably further contains a compound represented by formula (A).

X—Y-Z           Formula (A):

In formula (A), X represents a group represented by —N($Q_1$)-$Q_2$, Z represents a group represented by —N($Q_1$)-$Q_2$ or —O-$Q_3$, and Y represents a group represented by —W-$(G)_k$-$(H)_n$—.

W and H each represents a group represented by —CO—, —$SO_2$— or —PO($Q_4$)-, preferably a carbonyl group or a sulfonyl group.

G represents a divalent linking group. Preferred examples of the divalent linking group include an alkylene group, an alkenylene group, an alkynylene group, an arylene group, an ether bond-type oxygen atom, an imino group, an alkylimino group, a thioether bond-type sulfur atom, and a group represented by -V- (wherein V represents a heterocyclic ring).

The alkylene group represented by G is preferably an alkylene group having from 1 to 20 carbon atoms, such as methylene group, ethylene group, 1,3-propylene group, 1,2-propylene group, 1,4-butylene group, 1,6-hexylene group and 1,8-octylene group.

The alkenylene group is preferably an alkenylene group having from 1 to 20 carbon atoms, such as a vinylene group.

The arylene group is preferably an arylene group having from 1 to 20 carbon atoms, such as 1,2-phenylene group, 1,3-phenylene group, 1,4-phenylene group, 1,8-naphthylene group, 1,5-naphthylene group and 2,6-naphthylene group.

$Q_1$ to $Q_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group.

The alkyl group represented by $Q_1$ to $Q_4$ is preferably an alkyl group having from 1 to 30 carbon atoms, more preferably from 1 to 15 carbon atoms, such as methyl group, tert-butyl group and cyclohexyl group.

The alkenyl group is preferably an alkenyl group having from 2 to 30 carbon atoms, more preferably from 2 to 15 carbon atoms, such as vinyl group, 1-propenyl group, 1-buten-2-yl group and cyclohexen-1-yl group.

The alkynyl group is preferably an alkynyl group having from 2 to 30 carbon atoms, more preferably from 2 to 15 carbon atoms, such as ethynyl group and 1-propynyl group.

The aryl group is preferably an aryl group having from 6 to 30 carbon atoms, more preferably from 6 to 15 carbon atoms, such as phenyl group, tolyl group, xylyl group, naphthyl group, biphenylyl group and pyrenyl group.

The heterocyclic group and heteroaryl group each is a preferably a 5- or 6-membered ring and may be condensed with another ring. Examples of the heteroatom include a nitrogen atom, an oxygen atom and a sulfur atom. The heterocyclic or heteroaryl group is preferably a heterocyclic or heteroaryl group having from 2 to 30 carbon atoms, more preferably from 2 to 15 carbon atoms, such as pyridyl group, piperidyl group, oxazolyl group, oxadiazolyl group, tetrahydrofuryl group and thienyl group.

The heterocyclic ring represented by V above has the same meaning as the heterocyclic group described here.

The alkoxy group is preferably an alkoxy group having from 1 to 30 carbon atoms, more preferably from 1 to 15 carbon atoms, such as methoxy group, ethoxy group and cyclohexyloxy group.

The aryloxy group is preferably an aryloxy group having from 6 to 30 carbon atoms, more preferably from 6 to 15 carbon atoms, such as phenoxy group, 1-naphthoxy group and 4-phenylphenoxy group.

Examples of the heterocyclic ring in the heterocyclic oxy group, heteroaryloxy group, heterocyclic amino group and heteroarylamino group are the same as those described above.

The amino group in the alkylamino group, arylamino group, heterocyclic amino group and heteroarylamino group may be either a primary amino group or a secondary amino group.

These groups represented by G and $Q_1$ to $Q_4$ each may have a substituent, if possible, and examples of the substituent include a halogen atom, a cyano group, a formyl group, an alkyl group, an alkenyl group, an alkynyl group, an aryl group, a heterocyclic group, a primary, secondary or tertiary amino group, an imino group, an alkoxy group, an aryloxy group, an alkylthio group, an arylthio group, a carbonamido group, a sulfonamido group, a carbamoyl group, a sulfamoyl group, an alkylcarbonyl group, an arylcarbonyl group, an alkylsulfonyl group, an arylsulfonyl group, an alkoxycarbonyl group, an aryloxycarbonyl group, an alkylcarbonyloxy group, an arylcarbonyloxy group, a urethane group, a ureido group and a carbonyl acid ester group. Among these, preferred are an alkyl group, an aryl group, an alkoxy group and an aryloxy group, more preferred are an alkyl group and an aryl group.

When the substituent is a halogen atom, the halogen atom is preferably a fluorine atom, a chlorine atom, a bromine atom or an iodine atom.

When the substituent is an alkyl group, the alkyl group is preferably an alkyl group having from 1 to 30 carbon atoms, more preferably from 1 to 15 carbon atoms, such as methyl group, tert-butyl group and cyclohexyl group.

The alkenyl group is preferably an alkenyl group having from 2 to 30 carbon atoms, more preferably from 2 to 15 carbon atoms, such as vinyl group, 1-propenyl group, 1-buten-2-yl group and cyclohexen-1-yl group.

The alkynyl group is preferably an alkynyl group having from 2 to 30 carbon atoms, more preferably from 2 to 15 carbon atoms, such as ethynyl group and 1-propynyl group.

The aryl group is preferably an aryl group having from 6 to 30 carbon atoms, more preferably from 6 to 15 carbon atoms, such as phenyl group, tolyl group, xylyl group, naphthyl group, biphenylyl group and pyrenyl group.

The heterocyclic group is a preferably a 5- or 6-membered ring and may be condensed with another ring. Examples of the heteroatom include a nitrogen atom, an oxygen atom and a sulfur atom. The heterocyclic group is preferably a heterocyclic group having from 2 to 30 carbon atoms, more preferably from 2 to 15 carbon atoms, such as pyridyl group, piperidyl group, oxazolyl group, oxadiazolyl group, tetrahydrofuryl group and thienyl group.

Examples of the primary, secondary or tertiary amino group include an amino group, an alkylamino group, an arylamino group, a dialkylamino group, a diarylamino group, an alkylarylamino group, a heterocyclic amino group and a bisheterocyclic amino group. The amino group is preferably a tertiary amino group having from 1 to 30 carbon atoms, more preferably from 1 to 16 carbon atoms, such as dimethylamino group, diphenylamino group and phenylnaphthylamino group.

The imino group is a group represented by $-CR_{11}=NR_{12}$ or $-N=CR_{13}R_{14}$, wherein $R_{11}$ to $R_{14}$ each is a hydrogen atom or a group selected from an alkyl group, an aryl group, a heterocyclic group, an alkoxy group, an aryloxy group, a primary amino group, a secondary amino group and a tertiary amino group. The imino group is preferably an imino group having from 1 to 30 carbon atoms, more preferably from 1 to 15 carbon atoms.

The alkoxy group is preferably an alkoxy group having from 1 to 30 carbon atoms, more preferably from 1 to 15 carbon atoms, such as methoxy group, ethoxy group and cyclohexyloxy group.

The aryloxy group is preferably an aryloxy group having from 6 to 30 carbon atoms, more preferably from 6 to 15 carbon atoms, such as phenoxy group, 1-naphthoxy group and 4-phenylphenoxy group.

The alkylthio group is preferably an alkylthio group having from 1 to 30 carbon atoms, more preferably from 1 to 15 carbon atoms, such as methylthio group, ethylthio group and cyclohexylthio group.

The arylthio group is preferably an arylthio group having from 6 to 30 carbon atoms, more preferably from 6 to 15 carbon atoms, such as phenylthio group and tolylthio group.

The carbonamido group is preferably a carbonamido group having from 1 to 30 carbon atoms, more preferably from 1 to 15 carbon atoms, such as acetamido group, benzoylamido group and N-methylbenzoylamido group.

The sulfonamido group is preferably a sulfonamido group having from 1 to 30 carbon atoms, more preferably from 1 to 15 carbon atoms, such as methanesulfonamido group, benzenesulfonamido group and p-toluenesulfonamido group.

The carbamoyl group is preferably a carbamoyl group having from 1 to 30 carbon atoms, more preferably from 1 to 15 carbon atoms, such as unsubstituted carbamoyl group, methylcarbamoyl group, dimethylcarbamoyl group, phenylcarbamoyl group, diphenylcarbamoyl group and dioctylcarbamoyl group.

The sulfamoyl group is preferably a sulfamoyl group having from 1 to 30 carbon atoms, more preferably from 1 to 15 carbon atoms, such as unsubstituted sulfamoyl group, methylsulfamoyl group, dimethylsulfamoyl group, phenylsulfamoyl group, diphenylsulfamoyl group and dioctylsulfamoyl group.

The alkylcarbonyl group is preferably an alkylcarbonyl group having from 1 to 30 carbon atoms, more preferably from 1 to 15 carbon atoms, such as acetyl group, propionyl group, butyroyl group and lauroyl group.

The arylcarbonyl group is preferably an arylcarbonyl group having from 6 to 30 carbon atoms, more preferably from 6 to 15 carbon atoms, such as benzoyl group and naphthoyl group.

The alkylsulfonyl group is preferably an alkylsulfonyl group having from 1 to 30 carbon atoms, more preferably from 1 to 15 carbon atoms, such as methanesulfonyl group and ethanesulfonyl group.

The arylsulfonyl group is preferably an arylsulfonyl group having from 6 to 30 carbon atoms, more preferably from 6 to 15 carbon atoms, such as benzenesulfonyl group, p-toluenesulfonyl group and 1-naphthalenesulfonyl group.

The alkoxycarbonyl group is preferably an alkoxycarbonyl group having from 1 to 30 carbon atoms, more preferably from 1 to 15 carbon atoms, such as methoxycarbonyl group, ethoxycarbonyl group and butoxycarbonyl group.

The aryloxycarbonyl group is preferably an aryloxycarbonyl group having from 6 to 30 carbon atoms, more preferably from 6 to 15 carbon atoms, such as phenoxycarbonyl group and 1-naphthoxycarbonyl group.

The alkylcarbonyloxy group is preferably an alkylcarbonyloxy group having from 1 to 30 carbon atoms, more preferably from 1 to 15 carbon atoms, such as acetoxy group, propionyloxy group and butyroyloxy group.

The arylcarbonyloxy group is preferably an arylcarbonyloxy group having from 6 to 30 carbon atoms, more preferably from 6 to 15 carbon atoms, such as benzoyloxy group and 1-naphthoyloxy group.

The urethane group is preferably a urethane group having from 1 to 30 carbon atoms, more preferably from 1 to 15 carbon atoms, such as methoxycarbonamido group, phenoxycarbonamido group and methylaminocarbonamido group.

The ureido group is preferably a ureido group having from 1 to 30 carbon atoms, more preferably from 1 to 15 carbon atoms, such as methylaminocarbonamido group, dimethylaminocarbonamido group and diphenylaminocarbonamido group.

The carbonic ester group is preferably a carbonic ester group having from 1 to 30 carbon atoms, more preferably from 1 to 15 carbon atoms, such as methoxycarbonyloxy group and phenoxycarbonyloxy group.

Among these substituents, preferred are an alkyl group, an aryl group, an alkoxy group and an aryloxy group, more preferred are an alkyl group and an aryl group.

X and Z each is preferably a hydrogen atom or an amino group substituted by an alkyl group.

X and Z may combine with each other to form a ring. k and n each represents 0 or 1, preferably 0.

Specific examples of the compound represented by formula (A) are set forth below, but the present invention is of course not limited thereto.

SPECIFIC EXAMPLES urea
methylurea
N,N'-dimethylurea
tetramethylurea
ethylurea
tetraethylurea
ethyleneurea
imidazolidinone
sulfonylurea
oxamide
hexamethylphosphotriamide (HMPA)
oxazolidinone
4-isopropyloxazolidinone
2-methyl-2-oxazoline
2-ethyl-2-oxazoline
hydroxyurea
tetrahydro-2-pyrimidone
semicarbazide
buiret
glycoluril
hydantoin
1-methylhydantoin
5,5-dimethylhydantoin
5-hydantoinacetic acid
allantoin
parabanic acid
urazole
4-methylurazole
5,6-dihydrouracil
barbituric acid
1,3-dimethylbarbituric acid
dimethyloxamide
malondiamide
succinamide
adipamide
sebacinamide
fumalamide
2-oxazolidone
3-methyl-2-oxazolidinone
2,5-oxazolidinedione The compound represented by formula (A) can be used in an amount over a wide range but the amount added thereof is preferably from 0.001 to 80 mass %, more preferably from 0.1 to 50 mass %, still more preferably from 1 to 30 mass %, based on the ink.

By containing the compound represented by formula (A), the discharge stability of the ink is enhanced and this effect is lasting, so that even when the ink is aged in the state of being charged in an inkjet printer, excellent discharge property can be maintained.

In the ink of the present invention, in order to obtain a full color image or adjust the color tone, other dyes may be used in combination with the black dye according to the present invention. Examples of the dye which can be used in combination include the followings.

The dye used in combination may be a dye (monodisperse coloring matter) in a narrow sense or may be a pigment.

Also, a water-insoluble pigment may be dispersed in a dye-based ink or a water-soluble dye may be contained in a pigment-based ink.

In the case where the dye represented by formula (I) and another dye or pigment are present in combination in one ink composition, the total concentration thereof is from 0.2 to 20 mass %, preferably from 0.5 to 15 mass %.

The dye which can be used in combination with the yellow dye according to the present invention, for example, the dye represented by formula (1), is used in an ink of an ink set having the same main absorption region or in an ink or ink set combined therewith and having a different main absorption region. Examples of the coloring matter which can be used in combination include the followings.

Dyes known in this field, such as triarylmethane dye, anthraquinone dye, anthrapyridone dye, azomethine dye, azo dye, cyanine dye, merocyanine dye and oxonol dye, can be used individually or in combination.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-based dyes such as naphthoquinone dye and anthraquinone dye. Other examples of the dye species include quinophthalone dye, nitro•nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-based dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo.thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

A black dye such as polyazo dye can also be used.

The water-soluble dye includes a direct dye, an acid dye, a food dye, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

In the ink composition of the present invention, for adjusting the color tone so as to obtain a full color image, other coloring materials can be used together with the above-described dye. Examples of the other coloring material which can be used together include the following pigments.

As the pigment for use in the present invention, commercially available pigments and known pigments described in various publications can be used. Examples of the publication include *Color Index*, compiled by The Society of Dyers and Colourists, *Kaitei Shin Han Ganryo Binran (Revised New Handbook of Pigments)*, compiled by Nippon Ganryo Gijutsu Kyokai (1989), *Saishin Ganryo Oyo Gijutsu (Newest Pigment Application Technology)*, CMC Shuppan (1986), *Insatsu Ink Gijutsu (Printing Ink Technique)*, CMC Shuppan (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-based pigment, anthraquinone-based pigment, perylene- or perynone-based pigment, indigo-based pigment, quinacridone-based pigment, dioxazine-based pigment, isoindolinone-based pigment, quinophthalone-based pigment, diketopyrrolopyrrole-based pigment), dyeing lake pigments (lake pigments of acidic or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As for the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As for the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-based pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-based C.I. Pigment Red 81:1 and C.I. Pigment Violet 1, 2, 3, 27 and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (for example, C.I. Pigment Violet 5:1, 31 and 33) and thioindigo-based pigments (for example, C.I. Pigment Red 38 and 88) are preferred.

As for the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, and benzimidazolone-type C.I. Pigment Yellow 120, 151, 154, 156 and 180, and among these, those not using a benzidine-based compound as a raw material are more preferred), isoindoline isoindolinone-based pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As for the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the present invention may be the above-described pigment as-is or may be the pigment subjected to a surface treatment. The surface treatment may be performed, for example, by a method of coating the surface with resin or wax, a method of attaching a surfactant, or a method of binding a reactive substance (for example, a radical generated from a silane coupling agent, an epoxy compound, a polyisocyanate or a diazonium salt) to the pigment surface, and these methods are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. patents of (4) and capsulated pigments prepared by the method described in Japanese patent publications of (5) are effective, because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after dispersion, preferably from 0.01 to 10 μm, more preferably from 0.05 to 1 μm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganyo Oyo Gijutsu* (*Newest Pigment Application Technology*), CMC Shuppan (1986).

Other components which can be contained in each constituent ink of the ink set for inkjet recording of the present invention are described below.

Each constituent ink may contain a surfactant and by containing a surfactant, the liquid properties of ink can be controlled to provide excellent effects such as enhancement of discharge stability of ink, improvement of water resistance of image, and prevention of bleeding of ink printed.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 mass %, preferably from 0.005 to 10 mass %, more preferably from 0.01 to 5 mass %, based on the ink.

Each constituent ink can be prepared by dissolving and/or dispersing the constituent components such as dye, and a surfactant in an aqueous medium. The term "aqueous medium" as used in the present invention means water or a mixture of water and a small amount of water-miscible organic solvent, where additives such as wetting agent, stabilizer and antiseptic are added, if desired.

The ink of the present invention preferably further contains at least one organic solvent having a boiling point of 150° C. or more, more preferably at least one organic solvent having a boiling point of 150° C. or more and at least one organic solvent having a boiling point of less than 150° C.

In this field, these organic solvents are materials having a function as a drying inhibitor, a penetration accelerator, a wetting agent or the like for the inkjet recording ink. A water-miscible organic solvent is particularly preferred. For preventing color bleeding of the image drawn, this can be achieved when the organic solvent is water-miscible. Examples of such a compound include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethyl-sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof In the present invention, when at least one organic solvent having a boiling point of 150° C. or more and at least one organic solvent having a boiling point of less than 150° C. are used in combination, the stability of the ink is more increased and the discharge stability is also enhanced. Out of the solvents described above, examples of the low boiling point solvent having a boiling point of less than 150° C. include methanol, ethanol, n-propanol, i-propanol, n-butanol, 2-butanol, tert-butanol, 2-methoxyethanol, 1-methoxy-2-propanol, 2-methoxy-1-propanol, acetone and acetonitrile. Among these solvents, preferred are those not containing a heteroatom other than an oxygen atom, more preferred are alcohol-based solvents.

The organic solvent having a boiling point of 150° C. or more may be selected from those described above and also in this case, solvents not containing a heteroatom other than an oxygen atom are preferred, and alcohol-based solvents are more preferred.

These water-miscible organic solvents are preferably contained in a total amount of 5 to 60 mass %, more preferably from 10 to 45 mass %, based on the ink.

Also, two or more low boiling point solvents selected from those described above and two or more high boiling point solvents selected from those described above may be used. The ratio of the low boiling point solvent in the entire organic solvent is preferably from 1 to 80 mass %, more preferably from 5 to 50 mass %.

In the present invention, as described above, the discharge stability is enhanced by containing a water-miscible high boiling point organic solvent, but on the other hand, when the amount of the water-miscible organic solvent is increased, this has an adverse effect of promoting the color bleeding. Therefore, the content of the water-miscible organic solvent is limited from the standpoint of preventing the color bleeding and in general, must be 20 mass % or less based on the entire mass of the ink composition. However, it has been found that when the compound represented by formula (A) is incorporated in a small amount, color bleeding can be prevented and at the same time, discharge stability can be ensured. That is, by incorporating the compound of formula (A) in an amount of 0.02 to 2 mass % based on the entire mass of the ink composition, even when the content of the water-miscible high boiling point organic solvent is 20 mass % or more, the bleeding can be prevented and both the prevention of color bleeding and the ensuring of discharge stability can be attained. The content of the water-miscible high boiling point organic solvent is 50 mass % or less, preferably from 20 to 35 mass %.

In preparing the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing a shearing force with use of a reversal agitator or a dissolver. Also, a stirring method utilizing a shearing force with the bottom surface of a vessel, such as magnetic stirrer, can be advantageously used.

In the case where the dye usable in the present invention is an oil-soluble dye, the ink solution can be prepared by dissolving the oil-soluble dye in a water-insoluble high boiling point organic solvent and emulsion-dispersing it in an aqueous medium.

The water-insoluble high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid and diphenylphosphoric acid). The high boiling point organic solvent can be used in an amount of, in terms of mass ratio to the oil-soluble dye, from 0.01 to 3 times, preferably from 0.01 to 1.0 times.

These water-insoluble high boiling point organic solvents may be used individually or as a mixture of several kinds

[for example, a mixture of tricresyl phosphate and dibutyl phthalate, a mixture of trioctyl phosphate and di(2-ethylhexyl) sebacate, or a mixture of dibutyl phthalate and poly(N-tert-butylacrylamide)].

Examples of the high boiling point organic solvent for use in the present invention, other than the above-described compounds, and/or the synthesis method of these high boiling point organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in an amount of, in terms of mass ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may be used at the emulsion-dispersion in view of emulsifiability. The low boiling point organic solvent is an organic solvent having a boiling point of about 30 to 150° C. under atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsion stabilizer, antiseptic and fungicide, can be added, if desired.

In the general emulsification method, an oil phase is added to an aqueous phase, but a so-called phase inversion emulsification method of adding dropwise an aqueous phase in an oil phase can also be preferably used.

In the present invention, various surfactants can be used at the emulsion-dispersion. Preferred examples thereof include anionic surfactants such as fatty acid salt, alkylsulfuric ester salt, alkylbenzenesulfonate, alkylnaphthalenesulfonate, dialkylsulfosuccinate, alkyl-phosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-based polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after emulsification, a water-soluble polymer may be added in combination with this surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains $-SO^{2-}$ or $-COO^-$. In the case where this polymer which does not substantially dissolve in an aqueous medium is used in combination, the polymer is preferably used in an amount of 20 mass % or less, more preferably 10 mass % or less, based on the high boiling point organic solvent.

In preparing an aqueous ink by dispersing the oil-soluble dye or high boiling point organic solvent through emulsion-dispersion, the control of particle size is important. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418. For example, the ink is diluted with distilled water to a particle concentration of 0.1 to 1 mass %, then, the particle size can be easily measured by a commercially available volume average particle size measuring apparatus (for example, Microtrac UPA (manufactured by Nikkiso K.K.)). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles by the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, the presence of coarse particles is revealed to greatly affect the printing performance. More specifically, the coarse particle clogs the nozzle of head or even if the nozzle is not clogged, forms a soil to bring about discharge failure or discharge slippage of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

For effectively reducing the average particle size and eliminating coarse particles, a mechanical emulsifying apparatus may be used.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-6-47264, but examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during filling of the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent, such as evaporation, vacuum evaporation and ultrafiltration. This removal of the low boiling point organic solvent is preferably performed as soon as possible immediately after the emulsification.

In the ink set for inkjet recording obtained by the present invention or in a constituent ink thereof, additives such as drying inhibitor for preventing clogging due to drying of ink at the discharge port, penetration accelerator for more successfully penetrating the ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof The drying inhibitor is preferably contained in an amount of 10 to 50 mass % based on the ink.

Examples of the penetration accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-based compounds described in JP-A-58-185677, JP-A-61-190537, JP-A-2-782, JP-A-5-197075 and JP-A-9-34057, benzophenone-based compounds described in JP-A-46-2784, JP-A-5-194483 and U.S. Pat. No. 3,214,463, cinnamic acid-based compounds described in JP-B-48-30492 (the term "JP-B" as used herein means an "examined Japanese patent publication"), JP-B-56-21141 and JP-A-10-88106, triazine-based compounds described in JP-A-4-298503, JP-A-8-53427, JP-A-8-239368, JP-A-10-182621 and JP-T-8-501291 (the term (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, as represented by stilbene-based compounds and benzoxazole-based compounds.

As for the antioxidant which is used in the present invention for improving the preservability of image, various organic or metal complex-based discoloration inhibitors can be used. Examples of the organic discoloration inhibitor include hydroquinones, alkoxy-phenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure,* Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the preserit invention include sodium dehydroacetate, sodium benzoate, sodium pyridinethione-1-oxide, ethyl p-hydroxybenzoate, 1,2-benzisothiazolin-3-one and salts thereof The fungicide is preferably used in an amount of 0.02 to 5.00 mass % based on the ink.

The fungicide is described in detail, for example, in *Bokin Bobai Zai Jiten* (*Dictionary of Bactericide and Fungicide*), compiled by Jiten Henshu Iinkai, The Society of Antibacterial and Antifungal Agents, Japan.

Examples of the rust inhibitor include acidic sulfite, sodium thiosulfate, ammon thioglycolate, diisopropylammonium nitrite, pentaerythritol tetranitrate, dicyclohexylammonium nitrite and benzotriazole. The rust inhibitor is preferably used in an amount of 0.02 to 5.00 mass % based on the ink.

The pH adjusting agent for use in the present invention can be suitably used, for example, from the standpoint of adjusting the pH and imparting dispersion stability. The pH of the ink is preferably adjusted to 4 to 11 at 25° C. If the pH is less than 4, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-based polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less and for the purpose of adjusting the viscosity, a viscosity adjusting agent is sometimes used.

Examples of the viscosity adjusting agent include celluloses, water-soluble polymers such as polyvinyl alcohol, and nonionic surfactants. The viscosity adjusting agent is described in detail in *Nendo Chosei Gijutsu* (*Viscosity Adjusting Technology*), Chap. 9, Technical Information Institute Co., Ltd. (1999), and *Inkjet Printer Yo Chemicals* (98 *Zoho*) -*Zairyo no Kaihatsu Doko•Tenbo Chosa*- (*Chemicals for Inkjet Printer* (*Enlarged Edition of* 98) -*Survey on Development Tendency•Prospect of Materials*-), pp. 162-174, CMC (1997).

In the present invention, if desired, various cationic, anionic or nonionic surfactants described above may be used as a dispersant or a dispersion stabilizer, and fluorine- or silicone-based compounds or chelating agents as represented by EDTA may be used as a defoaming agent.

In preparing the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing a shearing force with use of a reversal agitator or a dissolver. Also, a stirring method utilizing a shearing force with the bottom surface of a vessel, such as magnetic stirrer, can be advantageously used.

The recording paper and recording film for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used. The thickness of the support is preferably from 10 to 250 μm and the basis weight is preferably from 10 to 250 g/m$^2$.

An image-receiving layer and a backcoat layer may be provided on the support as-is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-based pigment, acryl-based pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process or a silicic acid hydrate obtained by a wet production process, but a silicic acid hydrate is preferred. These pigments may be used in combination of two or more thereof Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and separation resistance of the image-receiving layer.

The image-receiving layer may contain a mordant, a water-proofing agent, a light fastness enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent pictorial quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cationic polyacrylamide and colloidal silica. Among these cationic resins, polyamidopolyamine epichlorohydrin is preferred. The content of the cationic resin is preferably from 1 to 15 mass %, more preferably from 3 to 10 mass %, based on the entire solid content of the ink-receiving layer.

Examples of the light fastness enhancer include zinc sulfate, zinc oxide, hindered amine-based antioxidant and benzotriazole-based ultraviolet absorbent such as benzophenone. Among these, zinc sulfate is preferred.

The surfactant functions as a coating aid, a releasability improver, a slipperiness improver or an antistatic agent. This surfactant is described in JP-A-62-173463 and JP-A-62-183457.

Instead of the surfactant, an organofluoro compound may be used. The organofluoro compound is preferably hydrophobic. Examples of the organofluoro compound include fluorine-containing surfactants, oily fluorine-based compounds (for example, fluorine oil) and solid fluorine compound resins (for example, ethylene tetrafluoride resin). The organofluoro compound is described in JP-B-57-9053 (columns 8 to 17), JP-A-61-20994 and JP-A-62-135826.

Examples of the hardening agent which can be used include the materials described in JP-A-1-161236 (page 222).

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of ether one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-based plastic pigment, acryl-based plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension or preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and is used for a known system, for example, an electric charge control system of discharging the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and discharging the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the pictorial quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns drawn using a dye, which can be perceived by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns drawn using a dye, which can be perceived by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns drawn using a dye, which can be perceived by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a coloring material in the form of a reactive dye having introduced thereinto a reactive group. Among these, preferred is dyeing by mordanting.

EXAMPLES

The present invention is described below by referring to Examples, but the present invention is not limited thereto.

Example 1

<Production of Ink Set Sample>

Deionized water was added to the following components to make 1 liter and the resulting solution was stirred for 1 hour under heating at 30 to 40° C. Thereafter, the pH was adjusted to 6.0 by using 1 mol/liter of hydrochloric acid or potassium hydroxide and then the solution was filtered under reduced pressure through a microfilter having an average pore size of 0.25 µm to prepare Black Ink Bk-101.

[Formulation of Black Ink Bk-101]

| (Solid Contents) | |
| --- | --- |
| Black dye of the present invention (L: long-wave side) (BL-1) ($\lambda$max: 589 nm, half-value width: 125 nm) | 75 g/liter |
| Black dye of the present invention (S: short-wave side) (BS-1) ($\lambda$max: 462 nm) | 30 g/liter |
| Urea | 10 g/liter |
| (Liquid Components) | |
| Diethylene glycol monobutyl ether (DGB) | 120 g/liter |
| Glycerin (GR) | 125 g/liter |
| Diethylene glycol (DEG) | 100 g/liter |
| 2-Pyrrolidone (PRD) | 35 g/liter |
| Triethanolamine (TEA) | 8 g/liter |
| Surfynol STG (SW) | 10 g/liter |

The oxidation potential of black dyes (L: BL-1 and S: BS-1) used here was 1.0 V (vs SCE) or more in any measuring method, that is, a dropping mercury electrode method using a 1 mmol/liter aqueous solution of dye, a cyclic voltammetry method and a rotating ring-disk electrode method.

Also, black inks were prepared in the same manner by using the following three dyes which are comparative dyes (the additive composition was the same).

1) A long-wave black dye (A) having an oxidation potential (Eox) of 1.0 V (vs SCE) or less.

2) A long-wave black dye (B) with the half-value width in the spectrum of a standardized dilute solution being 100 nm or less.

3) C.I. Direct Yellow 120 which is a short-wave black dye (C) having an oxidation potential (Eox) of 1.0 V (vs SCE) or less.

Here, the oxidation potential of the long-wave black dye (B) was also 1.0 V (vs SCE) or less.

As a reference ink, the black ink cartridge of PM-950C manufactured by Seiko Epson Corporation was used.

BL-1:

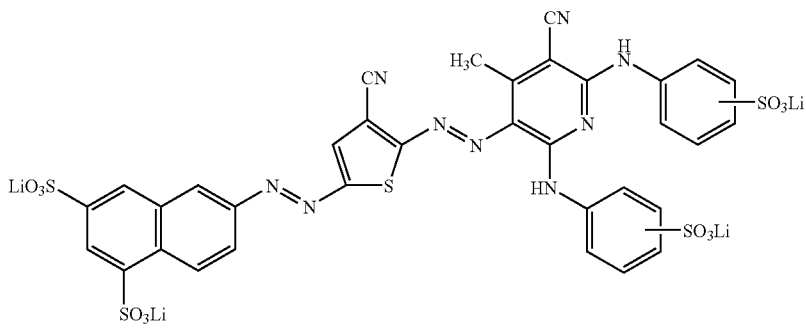

BS-1:

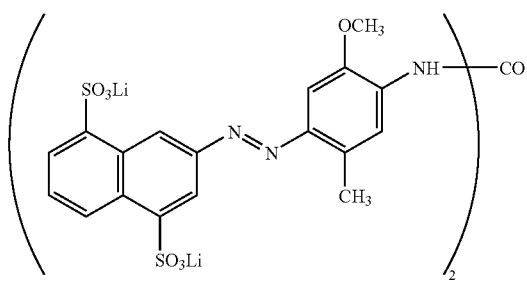

A: C.I. Food Black 2

B:

B:

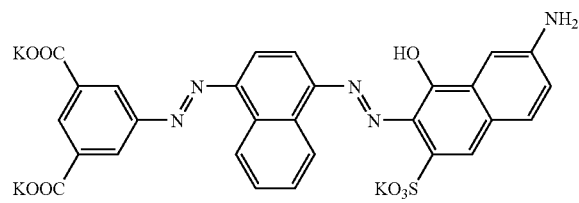

C: C.I. Direct Yellow 120

By using these dyes, Black Inks Bk-102 to Bk-104 shown in Table 1 below were produced. In Bk-101, urea coming under the compound of formula (A) of the present invention was used, and Inks Bk-105 to Bk-110 were also produced by changing this additive.

TABLE 1

| No. | Black Dye | Additive |
|---|---|---|
| PM-950C (Bk) (Reference) | — | — |
| Bk-101 (Invention) | BL-1, BS-1 | urea: 10 g/liter |
| Bk-102 (Comparison) | A, C | urea: 10 g/liter |
| Bk-103 (Comparison) | B, C | urea: 10 g/liter |
| Bk-104 (Comparison) | B, BS-1 | urea: 10 g/liter |
| Bk-105 (Invention) | BL-1, BS-1 | none |
| Bk-106 (Invention) | BL-1, BS-1 | hydroxyethyl acetate: 10 g/liter |
| Bk-107 (Invention) | BL-1, BS-1 | sulfonylurea: 10 g/liter |
| Bk-108 (Invention) | BL-1, BS-1 | ethyleneurea: 10 g/liter |
| Bk-109 (Invention) | BL-2, BS-1 | hexamethylphosphotriamide: 10 g/liter |
| Bk-110 (Invention) | BL-1, BS-2 | 1,2-dihydroxyethylurea: 10 g/liter |

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone of the image was evaluated with an eye by using a test image chart of ISO/JIS 12640. The image-receiving sheet on which the image was printed was Inkjet Photo Gloss Paper "Gasai" produced by Fuji Photo Film Co., Ltd. The image quality (visual evaluation), the discharge property of ink and the fastness of image were evaluated. Here, the Inkjet Photo Gloss Paper "Gasai" is a recording paper comprising a support having thereon an image-receiving layer containing an inorganic white pigment.

(Evaluation Tests)

1) As for the discharge stability, cartridges were set in the printer and after confirming the discharge of ink from all nozzles, the printer was stopped and left standing for 74 hours in an environment of 15° C. and 30% RH. Thereafter, letters were output on 100 sheets of A4-size image-receiving paper and evaluated based on the following criteria.

A: Printing was not disordered from start to end of printing.

B: Printing was disordered in some outputs.

C: Printing was disordered from start to end of printing.

2) As for the image preservability of the yellow dye, the pattern-drawn sample was evaluated as follows.

(1) In the evaluation of fastness to light, the image density Ci immediately after printing was measured by a reflection densitometer (X-Rite 310) using a reflection density measuring optical system defined in International Standard ISO-5 and after the image was irradiated with xenon light (85,000 lx) for 10 days by using a light fastness tester (Atlas Weather-O-meter C165) manufactured by Atlas Electric Device, the image density Cf was again measured. Then, the dye residual ratio (100×Cf/Ci) was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) In the evaluation of fastness to heat, the density was measured by X-Rite 310 before and after the sample was stored for 10 days under the conditions of 80° C. and 70% RH, and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) In the evaluation of ozone resistance, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310) and evaluated as the dye residual ratio. The dye residual ratio was measured at three points having a reflection density of 1, 1.5 and 2.0. The ozone gas concentration in the box was set by using an ozone gas monitor (Model OZG-EM-01) manufactured by APPLICS.

The sample was rated on a three-stage scale, namely, rated A when the dye residual ratio was 80% or more at any density, rated B when less than 80% at one or two point(s), and rated C when less than 70% at all points.

Incidentally, the relationship of these evaluations by Ranks A, B and C with the discoloration rate constant with an ozone gas is as follows.

A: Discoloration rate constant is $1.0 \times 10^{-2}$ hour$^{-1}$ or less.

B: Discoloration rate constant is from $1.0 \times 10^{-2}$ hour$^{-1}$ to $1.0 \times 10^{-1}$ hour$^{-1}$.

C: Discoloration rate constant is $1.0 \times 10^{-1}$ hour$^{-1}$ or more.

The results obtained are shown in Table 2.

TABLE 2

| No. | Discharge Property | Fastness to Light | Fastness to Heat | Fastness to $O_3$ |
| --- | --- | --- | --- | --- |
| PM-950C (Bk) (Reference) | A | B | B | C |
| Bk-101 (Invention) | A | A | A | A |
| Bk-102 (Comparison) | B | C | B | C |
| Bk-103 (Comparison) | B | C | B | C |
| Bk-104 (Comparison) | B | A | A | A |
| Bk-105 (Invention) | B | A | A | A |
| Bk-106 (Invention) | B | A | A | A |
| Bk-107 (Invention) | A | A | A | A |
| Bk-108 (Invention) | A | A | A | A |

TABLE 2-continued

| No. | Discharge Property | Fastness to Light | Fastness to Heat | Fastness to $O_3$ |
| --- | --- | --- | --- | --- |
| Bk-109 (Invention) | A | A | A | A |
| Bk-110 (Invention) | A | A | A | A |

As seen from the results in Table 2, the systems using the ink (Bk-101, Bk-105 to Bk-110) of the present invention surpassed Comparative Examples in the point that both the discharge stability and the fastness to all of light, heat and ozone oxidation were satisfied. Out of Examples of the present invention, the inks (Bk-101, Bk-107 to Bk-110) containing the compound of formula (A) were particularly excellent by exhibiting remarkably enhanced discharge stability. Also, the visual evaluation of the pictorial quality of image revealed that in the systems of the present invention, non-loosening of the black image was not fluctuated and kept in a good state.

Example 2

Black Ink Solution Bk-201 according to the following formulation was prepared in the same manner as Bk-101 in Example 1.

[Formulation of Black Ink Bk-201]

| (Solid Contents) | |
| --- | --- |
| Black dye of the present invention (L: long-wave side) (BL-1) ($\lambda$max: 589 nm, $W_{\lambda,1/2}$: 125 nm) | 75 g/liter |
| Black dye of the present invention (S: short-wave side) (BS-1) ($\lambda$max: 462 nm) | 30 g/liter |
| Proxel (2-benzoylisothazolin-3-one) | 5 g/liter |
| Urea | 10 g/liter |
| Benzotriazole | 3 g/liter |
| (Liquid Components) | |
| Diethylene glycol monobutyl ether (DGB) | 120 g/liter |
| Glycerin (GR) | 125 g/liter |
| Diethylene glycol (DEG) | 100 g/liter |
| 2-Pyrrolidone (PRD) | 35 g/liter |
| Triethanolamine (TEA) | 8 g/liter |
| Surfynol STG (SW) | 10 g/liter |

Black Inks Bk-202 to Bk-207 were prepared in the same manner as above by using the black dye shown in Table 3 for Black Ink Bk-201 (the composition except for the dye was the same as that of Bk-201).

As comparative dyes, a long-wave black dye (A) having an oxidation potential (Eox) of 1.0 V (vs SCE) or less, a long-wave black dye (B) having an oxidation potential of 1.0 V (vs SCE) or less with the half-value width ($W_{\lambda,1/2}$) in the spectrum of a standardized dilute solution being less than 100 nm, and a short-wave black dye (C) having an oxidation potential (Eox) of 1.0 V (vs SCE) or less, which were used for Comparative Examples also in Example 1, were used.

As a reference ink, the black ink cartridge of PM-950C manufactured by Seiko Epson Corporation was used.

TABLE 3
| Sample No. | Black Dye |
|---|---|
| PM-950C (Bk) (Reference) | — |
| Bk-201 (Invention) | BL-1, BS-1 |
| Bk-202 (Comparison) | A, C |
| Bk-203 (Comparison) | B, C |
| Bk-204 (Comparison) | B, BS-1 |
| Bk-205 (Invention) | BL-2, BS-1 |
| Bk-206 (Invention) | BL-1, BS-2 |
| Bk-207 (Invention) | BL-2, BS-2 |
BL-1:
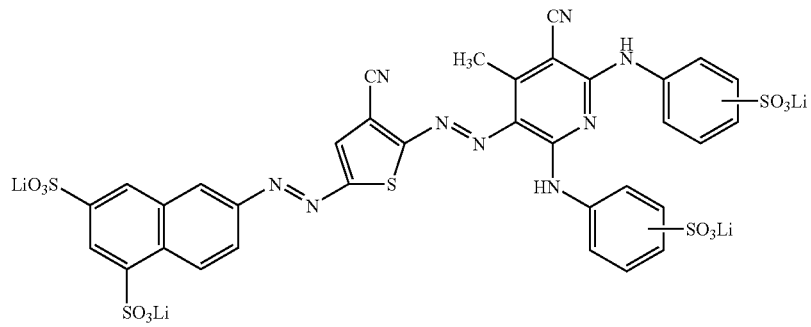
BL-2:
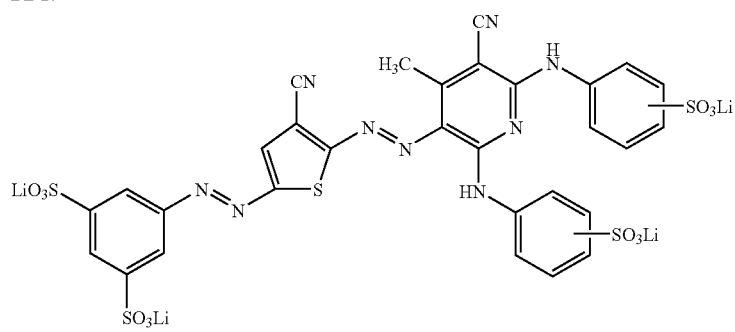
BS-1:
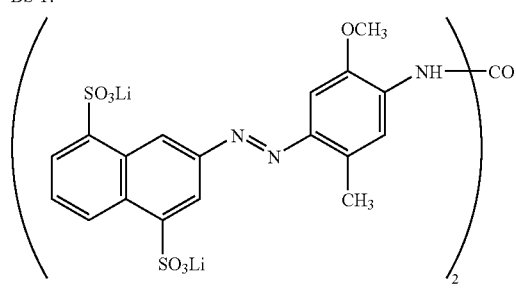
BS-2:
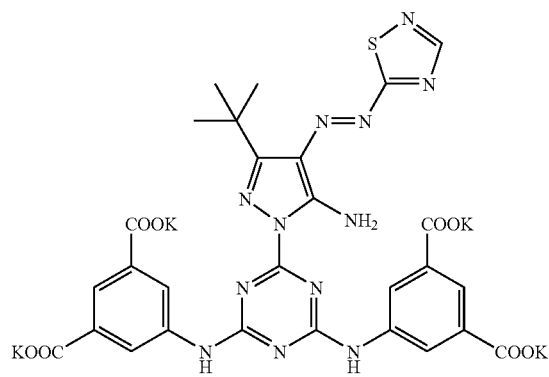

The black dyes (L: BL-1 and S: BS-1) and Comparative Dyes (A), (B) and (C) used here all are shown above. The oxidation potential (Eox) of the black dyes (L: BL-1 and S: BS-1) was determined by the above-described measuring method and confirmed to be positive than 1.0 V (vs SCE). Also, BL-2 had λmax of 590 nm and $W_{\lambda,1/2}$ of 122 nm and BS-2 had λmax of 457 nm.

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone of the image was evaluated with an eye by using a test image chart of ISO/JIS 12640. The image-receiving sheet on which the image was printed was Inkjet Photo Gloss Paper "Gasai" produced by Fuji Photo Film Co., Ltd. The image quality, the discharge property of ink and the fastness of image were evaluated in the same manner as in Example 1.

The results obtained are shown in Table 4.

TABLE 4

| No. | Discharge Property | Fastness to Light | Fastness to Heat | Fastness to $O_3$ |
|---|---|---|---|---|
| PM-950C (Bk) (Reference) | A | B | B | C |
| Bk-201 (Invention) | A | A | A | A |
| Bk-202 (Comparison) | A | C | B | C |
| Bk-203 (Comparison) | A | C | B | C |
| Bk-204 (Comparison) | A | B | A | B |
| Bk-205 (Invention) | A | A | A | A |
| Bk-206 (Invention) | A | A | A | A |
| Bk-207 (Invention) | A | A | A | A |

As seen from the results in Table 4, the systems using the ink of the present invention were satisfied in both the discharge stability and the fastness to all of light, heat and ozone oxidation, and surpassed Comparative Examples. Particularly, in the systems of the present invention, non-loosening of the black image was not fluctuated and kept in a good state.

When the black images were compared, in the systems (Bk-103 and Bk-104) using the long-wave black dye (B), the image was greatly deteriorated in the color balance after discoloration.

As for the pattern image, the reflection densities ($D_R$, $D_G$, $D_B$) of three colors of C (cyan), M (magenta) and Y (yellow) were also measured by using an X-rite 310TR densitometer having integrated therein a Status A filter. When the enforced discoloration rate constants ($k_R$, $k_G$, $k_B$) of the pattern image were determined from this experiment, in all of the systems (Bk-101 and Bk-105 to Bk-107) using the black ink of the present invention, the ratio (R) of the maximum value to the minimum value was 1.05 or less. On the other hand, in Bk-102 to Bk-104, the ratio (R) was 1.25 or more, revealing that the discoloration balance of the black image was greatly disrupted.

As apparent also from this fact, the effect of the present invention is expressed in response to the condition that the ratio (R) is 1.2 or less.

Incidentally, even when the image-receiving paper used in the present invention was changed to PM Photographic Paper produced by Seiko Epson Corporation or PR101 produced by Canon Inc., the same effects as in the results above were obtained.

Example 3

Black Ink Solution Bk-301 according to the following formulation was prepared in the same manner as Bk-101 in Example 1.

[Formulation of Black Ink Bk-301]

| (Solid Contents) | |
|---|---|
| Black dye of the present invention (L: long-wave side) (BL-1) (λmax: 589 nm, half-value width: 125 nm) | 75 g/liter |
| Black dye of the present invention (S: short-wave side) (BS-1) (λmax: 462 nm) | 30 g/liter |
| Proxel (2-benzoylisothazolin-3-one) | 5 g/liter |
| Urea | 10 g/liter |
| Benzotriazole | 3 g/liter |
| (Liquid Components) | |
| Diethylene glycol monobutyl ether (DGB) | 120 g/liter |
| Glycerin (GR) | 125 g/liter |
| Diethylene glycol (DEG) | 100 g/liter |
| 2-Pyrrolidone (PRD) | 35 g/liter |
| Triethanolamine (TEA) | 8 g/liter |
| Surfynol STG (SW) | 10 g/liter |

The black dyes (L: BL-1 and BL-2, and S: BS-1 and BS-2) and Comparative Dyes (A), (B) and (C) used here all are shown above.

As a reference ink, the black ink cartridge of PM-950C manufactured by Seiko Epson Corporation was used. Using these dyes, black inks shown below were prepared. The inks shown below were prepared by changing the water used for the preparation and using the dye after desalting purification, where the additive composition except for the dye was the same as in the formation of Bk-301.

TABLE 5

| No. | Black Dye | Mass Ratio of Dyes Added (BL-1/BL-2) |
|---|---|---|
| PM-950C (Bk) (Reference) | — | — |
| Bk-201 (Invention) | BL-1, BS-1 | — |
| Bk-202 (Comparison) | A, C | — |
| Bk-203 (Comparison) | B, C | — |
| Bk-204 (Comparison) | B, BS-1 | — |
| Bk-205 (Comparison) | BL-2, BS-1 | — |
| Bk-206 (Invention) | BL-1, BL-2, BS-1 | 3/1 |
| Bk-207 (Invention) | BL-1, BL-2, BS-1 | 1/1 |
| Bk-208 (Invention) | BL-1, BL-2, BS-1 | 1/3 |
| Bk-209 (Invention) | BL-1, BL-2, BS-2 | 1/2 |
| Bk-210 (Invention) | BL-1, BL-2, BS-2 | 1/1 |

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone of the image was evaluated with an eye by using a test image chart of ISO/JIS 12640. The image-receiving sheet on which the image was printed was Inkjet Photo Gloss Paper "Gasai" produced by Fuji Photo Film Co., Ltd. The image quality, the discharge property of ink and the fastness of image were evaluated.

The results obtained are shown in Table 6.

TABLE 6

| No. | Discharge Property | Fastness to Light | Fastness to Heat | Fastness to O$_3$ |
| --- | --- | --- | --- | --- |
| PM-950C (Bk) (Reference) | B | B | B | C |
| Bk-301 (Invention) | B | A | A | A |
| Bk-302 (Comparison) | B | C | B | C |
| Bk-303 (Comparison) | B | C | B | C |
| Bk-304 (Comparison) | B | C | A | C |
| Bk-305 (Comparison) | B | A | A | A |
| Bk-306 (Invention) | A | A | A | A |
| Bk-307 (Invention) | A | A | A | A |
| Bk-308 (Invention) | A | A | A | A |
| Bk-310 (Invention) | A | A | A | A |
| Bk-310 (Invention) | A | A | A | A |

As seen from the results in Table 6, the systems using the ink (Bk-301, Bk-306 to Bk-310) of the present invention surpassed Comparative Examples in the point that both the discharge stability and the fastness to all of light, heat and ozone oxidation were satisfied. Out of Examples of the present invention, the inks (Bk-306 to Bk-310) using two kinds of long-wave absorption side dyes in combination were particularly excellent by exhibiting remarkably enhanced discharge stability. Also, the visual evaluation of the pictorial quality of image revealed that in the systems of the present invention, non-loosening of the black image was not fluctuated and kept in a good state.

Example 4

An ink having the same composition as Bk-201 in Example 2 was prepared by the same preparation method and designated as Black Ink Solution Bk-401.

Black inks shown in Table 7 were prepared by changing the dye of Black Ink Bk-401 to each of Dyes BL-1, BS-1, A, B and C used in previous Examples.

TABLE 7

| No. | Black Dye | Solvent |
| --- | --- | --- |
| PM-950C (Bk) (Reference) | — | — |
| Bk-401 (Invention) | BL-1, BS-1 | DEG: 100 g/liter, PRD: 35 g/liter |
| Bk-402 (Comparison) | A, C | DEG: 100 g/liter, PRD: 35 g/liter |
| Bk-403 (Comparison) | B, C | DEG: 100 g/liter, PRD: 35 g/liter |
| Bk-404 (Comparison) | B, BS-1 | DEG: 100 g/liter, PRD: 35 g/liter |
| Bk-405 (Invention) | BL-1, BS-1 | TEG: 100 g/liter, PRD: 35 g/liter |
| Bk-406 (Invention) | BL-1, BS-1 | DEG: 100 g/liter, DMF: 35 g/liter |
| Bk-407 (Invention) | BL-1, BS-1 | PFG: 135 g/liter |
| Bk-408 (Invention) | BL-1, BS-1 | 2-methoxypropylene glycol: 135 g/liter |
| Bk-409 (Invention) | BL-1, BS-1 | 1-methoxypropylene glycol: 135 g/liter |
| Bk-410 (Invention) | BL-1, BS-1 | 1-ethoxyethylene glycol: 135 g/liter |

TEG: triethylene glycol, DMF: N,N-dimethylformamide) (both have a boiling point of 150° C. or more)
Boiling point of the solvents used in Bk-107 to Bk-110: 150° C. or less
PFG: propylene glycol monopropyl ether Also, Bk-405 to Bk-410 were prepared by changing diethylene glycol (DEG) and 2-pyrrolidone (PRD) out of four kinds of high boiling point solvents used in Bk-401.

As a reference ink, the black ink cartridge of PM-950C manufactured by Seiko Epson Corporation was used.

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone of the image was evaluated with an eye by using a test image chart of ISO/JIS 12640. The image-receiving sheet on which the image was printed was Inkjet Photo Gloss Paper "Gasai" produced by Fuji Photo Film Co., Ltd. The image quality, the discharge property of ink and the fastness of image were evaluated.

As for the blurring of the image under high-humidity condition, a printing pattern where four black square patterns each in a size of 3 cm×3 cm were arrayed to form a two-line and two-column table shape with a 1-mm white clearance between respective square patterns was prepared and after this image sample was stored for 10 days under the conditions of 25° C. and 90% RH, the bleeding of black dye in the white clearance was observed and the increase in the density ($D_{vis}$) on the white background with respect to the density immediately after printing was measured.

The sample was rated A when the increase in the density was less than 0.01, rated B when from 0.01 to 0.05, and rated C when more than 0.05.

The results obtained are shown in Table 8.

TABLE 8

| No. | Discharge Property | Fastness to Light | Fastness to Heat | Fastness to O$_3$ | Bleeding |
| --- | --- | --- | --- | --- | --- |
| PM-950C (Bk) (Reference) | A | B | B | C | B |
| Bk-401 (Invention) | A | A | A | A | A |
| Bk-402 (Comparison) | B | C | B | C | B |
| Bk-403 (Comparison) | B | C | B | C | B |
| Bk-404 (Comparison) | B | B | A | B | B |
| Bk-405 (Invention) | B | A | A | A | C |
| Bk-406 (Invention) | B | A | A | A | C |
| Bk-407 (Invention) | A | A | A | A | A |
| Bk-408 (Invention) | A | A | A | A | A |
| Bk-409 (Invention) | A | A | A | A | A |
| Bk-410 (Invention) | A | A | A | A | A |

As seen from the results in Table 8, the systems using the ink (Bk-401, Bk-405 to Bk-410) of the present invention surpassed Comparative Examples in the point that both the discharge stability and the fastness to all of light, heat and ozone oxidation were satisfied. Out of Examples of the present invention, the inks (Bk-405 to Bk-410) containing a low boiling point solvent were particularly excellent by exhibiting remarkably enhanced discharge stability and decreased in the bleeding. Also, the visual evaluation of the pictorial quality of image revealed that in the systems of the present invention, non-loosening of the black image was not fluctuated and kept in a good state.

When the black images were compared, in the systems (Bk-103 and Bk-104) using the long-wave black dye (B), the image was greatly deteriorated in the color balance after discoloration.

As for the pattern image, the reflection densities ($D_R$, $D_G$, $D_B$) of three colors of C (cyan), M (magenta) and Y (yellow) were also measured by using an X-rite 310TR densitometer having integrated therein a Status A filter and when the enforced discoloration rate constants ($k_R$, $k_G$, $k_B$) were determined, in all of the systems using the black ink of the present invention, the ratio (R) of the maximum value to the minimum value was 1.05 or less. On the other hand, in Bk-402 to Bk-404, the ratio (R) was 1.25 or more, revealing that the discoloration balance of the black image was greatly disrupted.

The effect of the present invention is apparent also from this fact.

Incidentally, even when the image-receiving paper used in the present invention was changed to PM Photographic Paper produced by Seiko Epson Corporation or PR101 produced by Canon Inc., the same effects as in the results above were obtained.

Example 5

Black Ink Solution Bk-501 according to the following formulation was prepared by the same operation as in the preparation of Bk-101 in Example 1.

[Formulation of Black Ink Bk-501]

(Solid Contents)

| | |
|---|---|
| Black dye of the present invention (L: long-wave side) (BL-1) ($\lambda$max: 589 nm, $W_{\lambda,1/2}$: 125 nm) | 75 g/liter |
| Black dye of the present invention (S: short-wave side) (BS-1) ($\lambda$max: 462 nm) | 30 g/liter |
| Proxel (2-benzoylisothazolin-3-one) | 5 g/liter |
| Urea | 10 g/liter |
| Benzotriazole | 3 g/liter |

(Liquid Components)

| | |
|---|---|
| Diethylene glycol monobutyl ether (DGB) | 120 g/liter |
| Glycerin (GR) | 125 g/liter |
| Diethylene glycol (DEG) | 100 g/liter |
| 2-Pyrrolidone (PRD) | 35 g/liter |
| Lithium hydroxide | 4 g/liter |
| Surfynol STG (SW) | 10 g/liter |

Black Inks Bk-502 to Bk-504 were prepared by using long-wave black dyes (A) and (B) and short-wave black dye BS-1 (C) in Black Ink Bk-501 as shown in Table 5.

As a reference ink, the black ink cartridge of PM-950C manufactured by Seiko Epson Corporation was used.

TABLE 9

| No. | Black Dye | Solvent |
|---|---|---|
| PM-950C (Bk) (Reference) | — | — |
| Bk-501 (Invention) | BL-1, BS-1 | 2-pyrrolidone: 35 g/liter |
| Bk-502 (Comparison) | A, C | 2-pyrrolidone: 35 g/liter |
| Bk-503 (Comparison) | B, C | 2-pyrrolidone: 35 g/liter |
| Bk-504 (Comparison) | B, BS-1 | 2-pyrrolidone: 35 g/liter |
| Bk-505 (Invention) | BL-1, BS-1 | N,N-dimethylacetamide: 35 g/liter |
| Bk-506 (Invention) | BL-1, BS-1 | 1,3-dimethylimidazolidinone: 35 g/liter |
| Bk-507 (Invention) | BL-1, BS-1 | triethylene glycol: 35 g/liter |
| Bk-508 (Invention) | BL-1, BS-1 | ethylene glycol: 35 g/liter |
| Bk-509 (Invention) | BL-1, BS-1 | 2-methoxypropylene glycol: 35 g/liter |
| Bk-510 (Invention) | BL-1, BS-1 | 1-methoxypropylene glycol: 35 g/liter |

Also, Bk-505 to Bk-510 shown in Table 9 were prepared by changing 2-pyrrolidone out of four kinds of high boiling point solvents used in Bk-501.

As a reference ink, the black ink cartridge of PM-950C manufactured by Seiko Epson Corporation was used.

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone of the image was evaluated with an eye by using a test image chart of ISO/JIS 12640. The image-receiving sheet on which the image was printed was Inkjet Photo Gloss Paper "Gasai" produced by Fuji Photo Film Co., Ltd. The image quality, the discharge property of ink and the fastness of image were evaluated.

The results obtained are shown in Table 10.

TABLE 10

| No. | Discharge Property | Fastness to Light | Fastness to Heat | Fastness to $O_3$ | Bleeding |
|---|---|---|---|---|---|
| PM-950C (Bk) (Reference) | A | B | B | C | B |
| Bk-501 (Invention) | A | A | A | A | B |
| Bk-502 (Comparison) | C | C | B | C | B |
| Bk-503 (Comparison) | C | C | B | C | B |
| Bk-504 (Comparison) | C | A | A | A | B |
| Bk-505 (Invention) | C | A | A | A | C |
| Bk-506 (Invention) | C | A | A | A | C |
| Bk-507 (Invention) | A | A | A | A | A |
| Bk-508 (Invention) | A | A | A | A | A |
| Bk-509 (Invention) | A | A | A | A | A |
| Bk-510 (Invention) | A | A | A | A | A |

As seen from the results in Table 10, the systems using the ink (Bk-501, Bk-505 to Bk-510) of the present invention surpassed Comparative Examples in the point that both the discharge stability and the fastness to all of light, heat and ozone oxidation were satisfied. Out of Examples of the present invention, the inks (Bk-507 to Bk-510) not using a solvent containing a heteroatom other than an oxygen atom were remarkably decreased in the bleeding and moreover, exhibited enhanced discharge stability. Also, the visual evaluation of the pictorial quality of image revealed that in the systems of the present invention, non-loosening of the black image was not fluctuated and kept in a good state.

When the black images were compared, in the systems (Bk-503 and Bk-504) using the long-wave black dye (B), the image was greatly deteriorated in the color balance after discoloration.

As for the pattern image, when the enforced discoloration rate constants ($k_R$, $k_G$, $k_B$) were determined the reflection densities ($D_R$, $D_G$, $D_B$) of three colors of C (cyan), M (magenta) and Y (yellow), in all of the systems using the black ink of the present invention, the ratio (R) of the maximum value to the minimum value was 1.05 or less. On the other hand, in Bk-502 to Bk-504, the ratio (R) was 1.25 or more, revealing that the discoloration balance of the black image was greatly disrupted.

The effect of the present invention is apparent also from this fact.

Incidentally, even when the image-receiving paper used in the present invention was changed to PM Photographic Paper produced by Seiko Epson Corporation or PR101 produced by Canon Inc., the same effects as in the results above were obtained.

Example 6

An ink having the same composition as Bk-101 in Example 1 was prepared by the same preparation method and designated as Black Ink Solution Bk-601.

Black Inks Bk-602 to Bk-610 shown in Table 11 below were prepared by using black dyes (L: BL-1, S: BS-1) and Comparative Dyes (A), (B) and (C) used in Example 1, further using black dyes (L: BL-2, S: BS-2) having an oxidation potential and spectral absorption characteristics preferred in the present invention, and also using in combination a compound of formula (A).

TABLE 11

| No. | Black Dye | Additive |
|---|---|---|
| PM-950C (Bk) (Reference) | — | — |
| Bk-601 (Invention) | BL-1, BS-1 | urea: 10 g/liter |
| Bk-602 (Comparison) | A, C | urea: 10 g/liter |
| Bk-603 (Comparison) | B, C | urea: 10 g/liter |
| Bk-604 (Comparison) | B, BS-1 | urea: 10 g/liter |
| Bk-605 (Invention) | BL-1, BS-1 | urea: 10 g/liter |
| Bk-106 (Invention) | BL-1, BS-1 | urea: 50 g/liter* |
| Bk-107 (Invention) | BL-1, BS-1 | sulfonylurea: 10 g/liter |
| Bk-108 (Invention) | BL-1, BS-1 | ethyleneurea: 10 g/liter |
| Bk-109 (Invention) | BL-2, BS-1 | hexamethylphosphotriamide: 10 g/liter |
| Bk-110 (Invention) | BL-1, BS-1 | 1,2-dihydroxyethylurea: 10 g/liter |

These inks each was filled in a black ink cartridge of an inkjet printer PM-950C manufactured by Seiko Epson Corporation and by using the inks of PM-950C for other colors, a gray image pattern and an image integrated with a letter pattern were printed. In these samples, a sample where a black square symbol of JIS code 2223 was printed in a 48-point size was included. Separately, the color tone and pictorial quality of the image were evaluated with an eye by using a test image chart of ISO/JIS 12640. The image-receiving sheet on which the image was printed was Inkjet Photo Gloss Paper "Gasai" produced by Fuji Photo Film Co., Ltd. The image quality, the discharge property of ink and the fastness of image were evaluated. Here, the Inkjet Photo Gloss Paper "Gasai" is a recording paper comprising a support having thereon an image-receiving layer containing an inorganic white pigment.

The color bleeding of the image was also evaluated by the method described in Example 4.

The results obtained are shown in Table 12.

TABLE 12

| No. | Discharge Property | Fastness to Light | Fastness to Heat | Fastness to $O_3$ | Bleeding |
|---|---|---|---|---|---|
| PM-950C (Bk) (Reference) | A | B | B | C | C |
| Bk-601 (Invention) | A | A | A | A | A |
| Bk-602 (Comparison) | B | C | B | C | B |
| Bk-603 (Comparison) | B | C | B | C | B |
| Bk-604 (Comparison) | B | A | A | A | B |
| Bk-605 (Invention) | A | A | A | A | B |
| Bk-606 (Invention) | A | A | A | A | B |
| Bk-607 (Invention) | A | A | A | A | A |
| Bk-608 (Invention) | A | A | A | A | A |
| Bk-609 (Invention) | A | A | A | A | A |
| Bk-610 (Invention) | A | A | A | A | A |

The results in Table 12 were well matching the test results of Example 1 and the systems using the ink (Bk-601, Bk-605 to Bk-610) of the present invention surpassed Comparative Examples (Bk-602 to Bk-604) in the point that both the discharge stability and the fastness to all of light, heat and ozone oxidation were satisfied. In particular, Bk-607 to Bk-610 containing a compound of formula (A) in an amount of 1 mass % or less were preferred because the bleeding was remarkably decreased.

Also, the visual evaluation of the pictorial quality of image revealed that in the systems of the present invention, non-loosening of the black image was not fluctuated and kept in a good state.

INDUSTRIAL APPLICABILITY

The aqueous ink of the present invention containing a dye in which λmax of the absorption spectrum in an aqueous solution is in the region from 500 and 700 nm and the standardized half-value width thereof is 100 nm or more is satisfied and excellent in both the discharge stability and the fastness to light, heat and oxidation. Also, when the dye contained in the ink, particularly, the dye having the above-described spectral characteristics, is a dye having an oxidation potential of 1.0 V vs SCE or more, 2) a dye having a discoloration rate constant of $5.0 \times 10^{-2}$ $Hr^{-1}$ or less, 3) a dye where the maximum value/minimum value ratio of discoloration rate constants of three colors is 1.2 or less, 4) a dye represented by formula (1), 4) a dye containing a compound of formula (A), 5) a dye containing a high boiling point water-miscible organic solvent, 6) particularly a dye containing 20 mass % or more of a water-miscible organic solvent having a boiling point of 100° C. or more and 2 mass % or less of a compound of formula (A), and 7) a dye containing a high boiling point water-miscible solvent and a low boiling point water-miscible solvent, the discharge stability and weather resistance are more enhanced and the effect of the present invention is elevated. The inkjet recording ink of the present invention is an ink capable of ensuring pictorial quality with no loosening in the gradation of neutral gray even by visual evaluation.

The invention claimed is:

1. A black ink for inkjet recording, comprising an aqueous medium having dissolved or dispersed therein at least one dye in which λmax of the absorption spectrum in an aqueous solution is in the region from 500 and 700 nm and the half-value width in the absorption spectrum of a dilute solution standardized to an absorbance of 1.0 is 100 nm or more.

2. The black ink for inkjet recording as claimed in claim 1, which comprises an aqueous medium having dissolved or dispersed therein at least one dye in which λmax of the absorption spectrum in an aqueous solution is in the region from 500 and 700 nm and the half-value width in the absorption spectrum of a dilute solution standardized to an absorbance of 1.0 is 100 nm or more, and at least one dye contained in said ink has an oxidation potential positive than 1.0 V (vs SCE).

3. The black ink for inkjet recording as claimed in claim 1, wherein said ink comprises an aqueous medium having dissolved or dispersed therein at least one dye in which λmax of the absorption spectrum in an aqueous solution is in the region from 500 and 700 nm, the half-value width in the absorption spectrum of a dilute solution standardized to an absorbance of 1.0 is 100 nm or more, and the oxidation potential is positive than 1.0 V (vs SCE).

4. The black ink for inkjet recording as claimed in claim 1, wherein when a black square symbol of JIS code 2223 is printed in a 48-point size and the density of a selected portion having a visual reflection density ($D_{vis}$) of 0.90 to 1.10 on the printed face is defined as the initial density and when this printed matter is enforcedly discolored by using an ozone discoloration tester capable of constantly generating 5 ppm of ozone and the enforced discoloration rate constant ($k_{vis}$) is determined by applying a first-order chemical reaction rule to the relationship of reflection density•time until the visual reflection density ($D_{vis}$) decreases to 80% of the initial density, the enforced discoloration rate constant ($k_{vis}$) is $5.0 \times 10^{-2}$ [hour$^{-1}$] or less.

5. The black ink for inkjet recording as claimed in claim 1, wherein when a black square symbol of JIS code 2223 is printed in a 48-point size and the densities of selected C, M and Y three color portions each having a reflection density ($D_R$, $D_G$, $D_B$) of 0.90 to 1.10 as measured with status A filter light are defined as the initial densities and when this printed matter is enforcedly discolored by using an ozone discoloration tester capable of constantly generating 5 ppm of ozone and three enforced discoloration rate constants ($k_R$, $k_G$, $k_B$) are determined by applying a first-order chemical reaction rule to the relationship of reflection density•time until the reflection densities ($D_R$, $D_G$, $D_B$) decrease to 80% of respective initial densities, the ratio (R) of the maximum value to the minimum value of these three rate constants is 1.2 or less.

6. The black ink for inkjet recording as claimed in claim 1, wherein the dye in which λmax of the absorption spectrum in an aqueous solution is in the region from 500 and 700 nm and the half-value width in the absorption spectrum of a dilute solution standardized to an absorbance of 1.0 is 100 nm or more is a dye represented by the following formula (1):

$$A\text{-}(N{=}N\text{-}B_m)_n\text{-}N{=}N\text{-}C \qquad \text{Formula (1):}$$

wherein A, B and C each independently represents an aromatic or heterocyclic group which may be substituted, and m and n each represents 0 or an integer of 1 or more.

7. The black ink for inkjet recording as claimed in claim 1, which comprises at least one compound represented by formula (A):

$$X\text{-}Y\text{-}Z \qquad \text{Formula (A):}$$

wherein X represents a group represented by —N($Q_1$)-$Q_2$, Z represents a group represented by —N($Q_1$)-$Q_2$ or —O-$Q_3$, Y represents a group represented by —W-(G)$_k$-(H)$_n$—, W and/or H represents a group represented by —CO—, —SO$_2$— or —PO($Q_4$)-, G represents a divalent linking group, $Q_1$ to $Q_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

8. The black ink for inkjet recording as claimed in claim 1, which further comprises at least one dye having λmax of the region from 350 to 500 nm.

9. The black ink for inkjet recording as claimed in claim 8, wherein the at least one dye having λmax of the region from 350 to 500 nm is a dye represented by formula (1).

10. The black ink for inkjet recording as claimed in claim 9, which comprises at least one dye having λmax of the region from 500 to 700 nm and the at least one dye having λmax of the region from 350 to 500 nm, wherein said dyes both have an oxidation potential positive than 1.0 V (vs SCE) and both are a dye represented by formula (1).

11. The black ink for inkjet recording as claimed in claim 9, which comprises at least one dye having λmax of the region from 500 to 700 nm and the at least one dye having λmax in the region from 350 to 500 nm, wherein said dyes both have an enforced discoloration rate constant ($k_{vis}$) defined in claim 5 of $5.0 \times 10^2$ [hour$^{-1}$] or less and both are a dye represented by formula (1).

12. The black ink for inkjet recording as claimed in claim 1, which comprises at least one organic solvent not containing a heteroatom other than an oxygen atom.

13. The black ink for inkjet recording as claimed in claim 1, which comprises an aqueous medium having dissolved and/or dispersed therein at least two dyes each having λmax of the region from 500 to 700 nm and the half-value width of 100 nm or more in the absorption spectrum of a dilute solution standardized to an absorbance of 1.0.

14. The black ink for inkjet recording as claimed in claim 1, wherein a water-soluble organic solvent having a boiling point of 150° C. or more is used.

15. The black ink for inkjet recording as claimed in claim 1, wherein the organic solvent used for said ink comprises at least one organic solvent having a boiling point of 150° C. or more and at least one organic solvent having a boiling point of 150° C. or less.

16. The black ink for inkjet recording as claimed in claim 1, which comprises: a water-miscible organic solvent having a boiling point of 100° C. or more in an amount of 20 mass % or more based on the entire amount of the ink; and the compound represented by formula (A) in an amount of 0.02 to 2 mass % based on the entire amount of the ink.

17. An inkjet recording method comprising using the inkjet recording ink claimed in claim 1.

18. The inkjet recording method as claimed in claim 17, comprising discharging ink droplets according to recording signals on an image-receiving material to record an image on the image-receiving material, the image-receiving material comprising a support having thereon an image-receiving layer containing inorganic white pigment particles, wherein the ink droplet comprises the ink for inkjet recording claimed in any one of claims 1 to 16.

* * * * *